United States Patent [19]

Tallman et al.

[11] Patent Number: 5,708,417

[45] Date of Patent: Jan. 13, 1998

[54] MONITORING SYSTEM FOR REMOTE UNITS

[75] Inventors: Erven Tallman, Palm Desert, Calif.; Jackie Hayes, Midland, Tex.; David Saylor, Huntington Beach; Mike Pierce, Oxnard, both of Calif.

[73] Assignee: Phone Alert Corp., E. Palm Desert, Calif.

[21] Appl. No.: 167,216

[22] Filed: Dec. 16, 1993

[51] Int. Cl.$^6$ ................................................ G08B 1/08
[52] U.S. Cl. .................. 340/539; 340/425.5; 340/426; 340/541; 340/438; 379/39; 379/40; 455/53.1; 455/54.1; 455/54.2
[58] Field of Search .......................... 340/426, 425.5, 340/438, 933, 541, 932.2, 568, 571, 572, 573, 539, 825.36, 825.49; 364/424.04; 379/38, 39, 40, 45; 455/53.1, 54.1, 54.2

[56] References Cited

U.S. PATENT DOCUMENTS

| | | | |
|---|---|---|---|
| 3,102,235 | 8/1963 | Jackson | 340/539 |
| 3,230,454 | 1/1966 | Van Burkleo | 340/539 |
| 3,618,067 | 11/1971 | DeVale | 340/518 |
| 3,668,675 | 6/1972 | Joens et al. | 340/539 |
| 4,067,411 | 1/1978 | Conley et al. | 180/169 |
| 4,074,230 | 2/1978 | Icenbice, Jr. | 371/39.1 |
| 4,316,176 | 2/1982 | Gee et al. | 340/447 |
| 4,352,097 | 9/1982 | Hamann | 340/571 |
| 4,354,252 | 10/1982 | Lamb et al. | 340/539 |
| 4,396,910 | 8/1983 | Enemark et al. | 340/539 |
| 4,468,655 | 8/1984 | Iwata | 340/518 |
| 4,698,748 | 10/1987 | Juzswik et al. | 395/750 |
| 4,804,957 | 2/1989 | Selph et al. | 340/870.03 |
| 4,821,027 | 4/1989 | Mallory et al. | 340/521 |
| 4,835,671 | 5/1989 | Sato et al. | 364/186 |
| 4,853,692 | 8/1989 | Wolk et al. | 340/573 |
| 4,887,064 | 12/1989 | Drori et al. | 340/426 |
| 4,904,983 | 2/1990 | Mitchell | 340/426 |
| 4,947,151 | 8/1990 | Rosenberger | 340/426 |
| 4,978,946 | 12/1990 | Nordholm et al. | 343/715 |
| 4,990,890 | 2/1991 | Newby | 340/539 |
| 4,994,787 | 2/1991 | Kratt et al. | 340/505 |
| 5,010,331 | 4/1991 | Dias et al. | 340/825.31 |
| 5,119,072 | 6/1992 | Hemingway | 340/573 |
| 5,140,308 | 8/1992 | Tanaka | 340/539 |
| 5,164,704 | 11/1992 | Steen et al. | 340/539 |
| 5,200,735 | 4/1993 | Hines | 340/539 |
| 5,319,698 | 6/1994 | Glidewell et al. | 379/39 |
| 5,416,466 | 5/1995 | Malvaso et al. | 340/539 |

OTHER PUBLICATIONS

P. 24 of Norco Industries' Catalog No. 6 Oct. 1, 1992.

*Primary Examiner*—Jeffery Hofsass
*Assistant Examiner*—Daryl C. Pope
*Attorney, Agent, or Firm*—Fulwider Patton Lee & Utecht, LLP

[57] ABSTRACT

A system for monitoring the status of mobile units includes a module and a local station. The module attaches to the mobile unit and includes a sensor and transmitter. The module transmits signals to a receiver at the local station. The signals can indicate shock, tampering, or theft. The receiver delivers the signal to a computer at the local station. The computer stores and analyzes the data. The computer includes a display, a keyboard, and a printer. The computer is programmed to present the data to the user and is fitted with an internal card to dial a monitoring station.

22 Claims, 21 Drawing Sheets

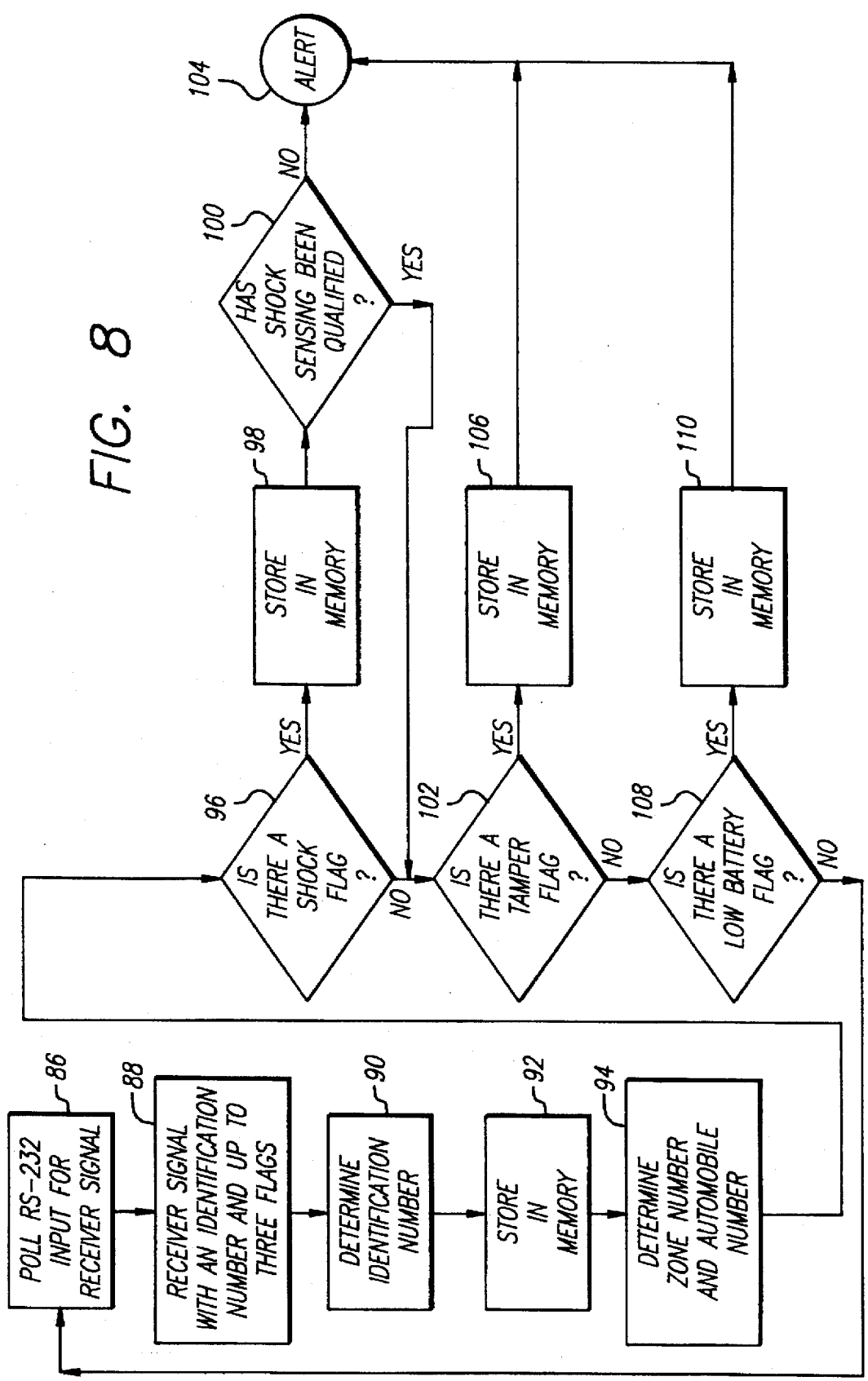

MONITORING SYSTEM FOR REMOTE UNITS

BACKGROUND OF THE INVENTION

1. Field of the Invention

This invention relates to systems for monitoring the status of mobile units and particularly to a system employing a plurality of modules mounted on the respective units to communicate status data to a central monitoring station.

2. Description of the Prior Art

Automobile sales lots and congregate care facilities are characterized by an ever changing inventory which must be monitored for custodial purposes. Devices have been proposed to monitor unattended automobiles to prevent or discourage theft. Numerous different anti-theft devices have included various bars to lock onto an automobile steering wheel and which in some instances attach to the accelerator pedal.

Other efforts have employed hidden switches to disable the ignition system and shock and motion sensors. Such sensors, upon impulse, actuate an automobile disabling switch and alarm as shown in U.S. Pat. No. 4,990,890. Additionally, it has been proposed to equip vehicles with external radar to sense unauthorized tampering. These systems are relatively expensive and are sometimes ineffective to monitor a large number of vehicles or to make a record of the vehicle subjected to the unauthorized activity. Also, they fail to provide for automatic telecommunication of the alarm.

Vehicle security systems have been proposed which included a respective immobilizer and transceiver module in each vehicle. A number of security stations are provided to detect low power signals emitted by vehicles when an unauthorized act is detected. The signals are transmitted to a base station in response to a polling signal therefrom. The compromised vehicle may be immobilized by signals from either the base station or from a security station. A system of this type is disclosed in U.S. Pat. No. 4,990,890.

Other systems have been proposed which include a transmitter in each vehicle to broadcast an emergency signal unique to the vehicle indicative of the nature of the emergency condition. A central station includes a receiver responsive to the signal to operate a transmitter to transmit a disabling signal to a receiver in the vehicle. An alarm sensor can be mounted on each automobile to be monitored. When disturbed, the alarm sensor actuates an automatic dialer to send either a voice or a digital signal identifying the vehicle by a radio telephone to an alarm receiving station. This system lacks a self contained transmission capability as it relies on the radio telephone. Such systems are shown in U.S. Pat. Nos. 4,067,411 and 4,904,983.

Monitoring systems have been proposed which incorporate transmitters mounted on vehicles to be monitored and operative to transmit a watch dog periodic signal to a central receiving station. The transmitted signals become weak and disappear if the vehicles are removed from beyond a predetermined boundary area. The transmitters are responsive to unauthorized tampering to discontinue transmitting thereby generating an alarm. A system of this type is disclosed in U.S. Pat. No. 3,618,067

In congregate care facilities such as hospitals and nursing homes, monitoring is required so the custodian acting as an overseer can readily check the status of a patient's condition. Further, to be effective, a congregate caretaker must quickly respond to any emergency call. In the past, patients have sometimes been provided with a pull cord or transmitter button to be used in case of emergency. These devices fail to communicate meaningful intelligence to enable the caretaker to determine whether the monitored item has moved from an authorized area or to discern the character of any distress call.

The above described systems of the prior art, while providing various forms of vibration and proximity sensors to monitor the condition and location of the mobile entity, fails to provide for data recording, management and communication to provide a reliable, instantaneous real time monitoring.

SUMMARY OF THE INVENTION

The monitoring system of the present invention is characterized by modules mounted on mobile units to operatively communicate status signals indicating shock, tamper, or proximity to a local computer station. A sensor is responsive to a sensed condition and is encoded with an identification signal to be transmitted to a receiver. The receiver converts the received signals into a data stream which is delivered to a local computer programmed to recognize the identification number of the module, correlate that identification number with the identity of the mobile unit, and recognize data flags indicative of sensed conditions. The computer is also programmed to detect when the status signal has been absent for a predetermined period. The computer is responsive to the encoded signal to operate a dialer card operative to dial a predetermined code into a telecommunication system using industry standard tones. The computer continuously stores data representative of the conditions sensed and automatically dials an alarm and a security service.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 8 is a flow chart of a computer routine for analysis of a signal from the receiver shown in FIG. 7;

DETAILED DESCRIPTION

Figure 1:
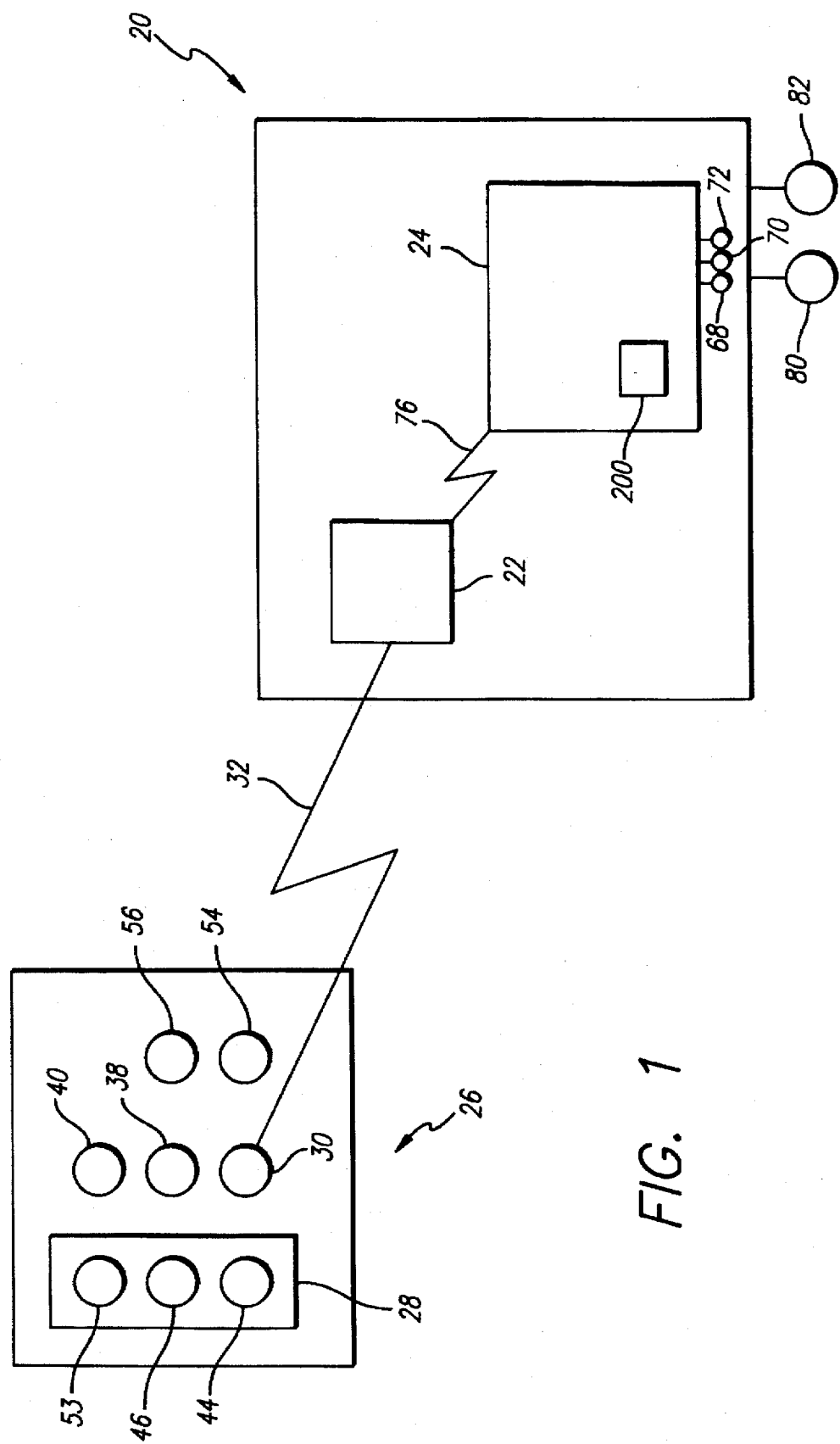
FIG. 1 presents a block diagram of a monitoring system in accordance with the invention.

As shown in the drawings for purposes of illustration, the invention is directed to a system for monitoring the status of individual mobile units within a group such as automobiles in a sales lot or patients in a hospital to, in response to a sensed condition, automatically dial an alarm to a central monitoring station or the like. Often the number of discrete entities or property units to be monitored are so great that it is not feasible for a single person to effectively monitor them.

The present invention is embodied in a system for monitoring a number of mobile units such as automobiles, personnel or animals. In accordance with the present invention, the system utilizes a module attached to the unit to be monitored to sense and transmit in response to conditions imposed on the unit. The module is coupled to a computer at a local station programmed to record data corresponding to such status conditions. The computer includes a dialer card responsive to a generated signal to transmit an alarm signal to a central monitoring station.

As shown in FIG. 1, the system includes, generally, a local station 20 including a local receiver 22 and a local computer 24 which records and analyzes communications from a plurality of remote modules 26. The modules each include sensors 28 to sense a condition and a transmitter 30 to transmit signals 32 to the local station. The signals transmitted may have any combination of a number of attributes including: shock to the module, tampering, such as an attempt to remove the module from the mobile unit, transportation beyond a predetermined boundary, and low battery in the module.

Figure 2:
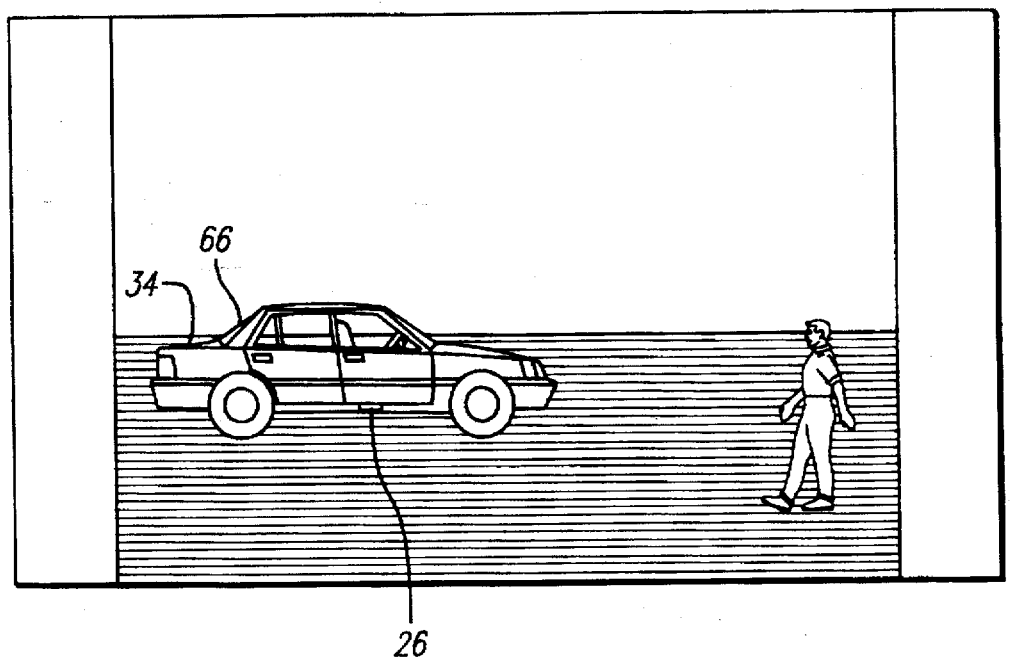
FIG. 2 is a side view of an automobile with a system module of FIG. 1 mounted thereon.
Figure 3:
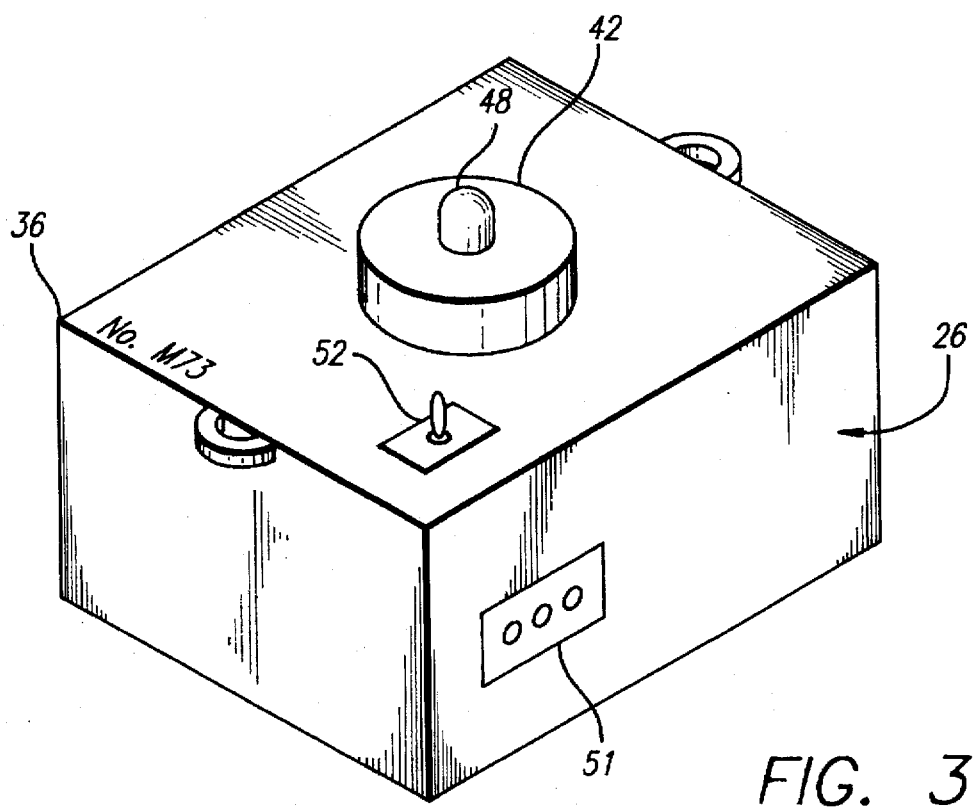
FIG. 3 is a perspective view in enlarged scale of the module shown in FIG. 1.

Referring to FIG. 2, automobiles 34 are typically randomly distributed around an automobile sales lot. The module 26 is attached to each automobile 34 on the lot. The modules 26 each include a housing 36 mounting the respective sensors 28 to activate a transmitter 30 for transmitting from an antenna 38, and a battery 40 as shown in FIGS. 1 and 3. The module housing 36 is constructed of plastic and mounts an annular magnet 42 by means of silicone. The sensors may include a shock sensor 44 (FIG. 1) which detects the presence of a certain level of movement of the car. There may also be a tamper sensor 46 which is activated by unauthorized tampering with the module. The module 26 is magnetically affixed by the magnet 42 to the underside of an automobile 34 as shown in FIG. 2. The module circuit includes a normally open spring loaded switch having an actuation arm which carries an actuation button 48 which protrudes through a bore 50 aligned with the opening in the magnet 42 and to depress to the closed position as a result of this attachment, as shown in FIG. 3. A data port connector 51 (FIG. 3) is formed through the housing and is coupled to the transmitter 30 within the module. An activation switch 52 is formed in said housing and connected in circuit with the internal components of the module to control power to the components.

Figure 4:
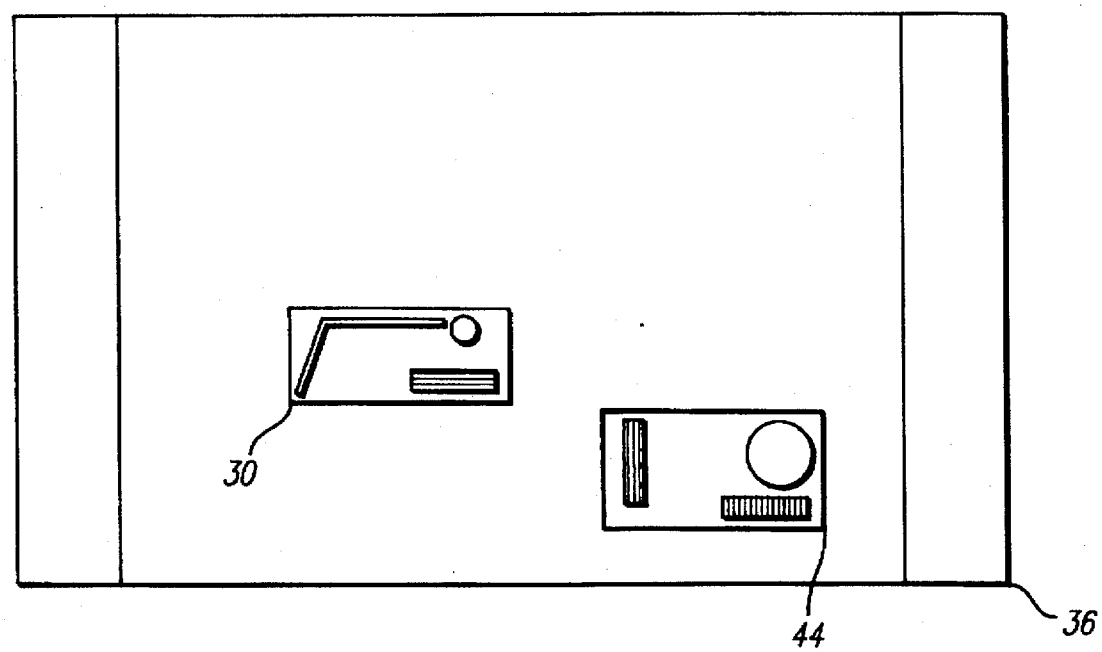
FIG. 4 is a top view of a sensor and a transmitter within the module shown in FIG. 3.

The antenna 38 (FIG. 1) is typically two and one-half to three inches long for nine hundred megahertz transmissions. The shock sensor 44 in such housing 36 shown in FIG. 4 is responsive to a preset level of movement or vibration to generate a shock signal representative of either shock or vibration. A low battery sensor 53 (FIG. 1) is responsive to battery voltage and generates a battery signal representative of the battery voltage.

Figure 5:
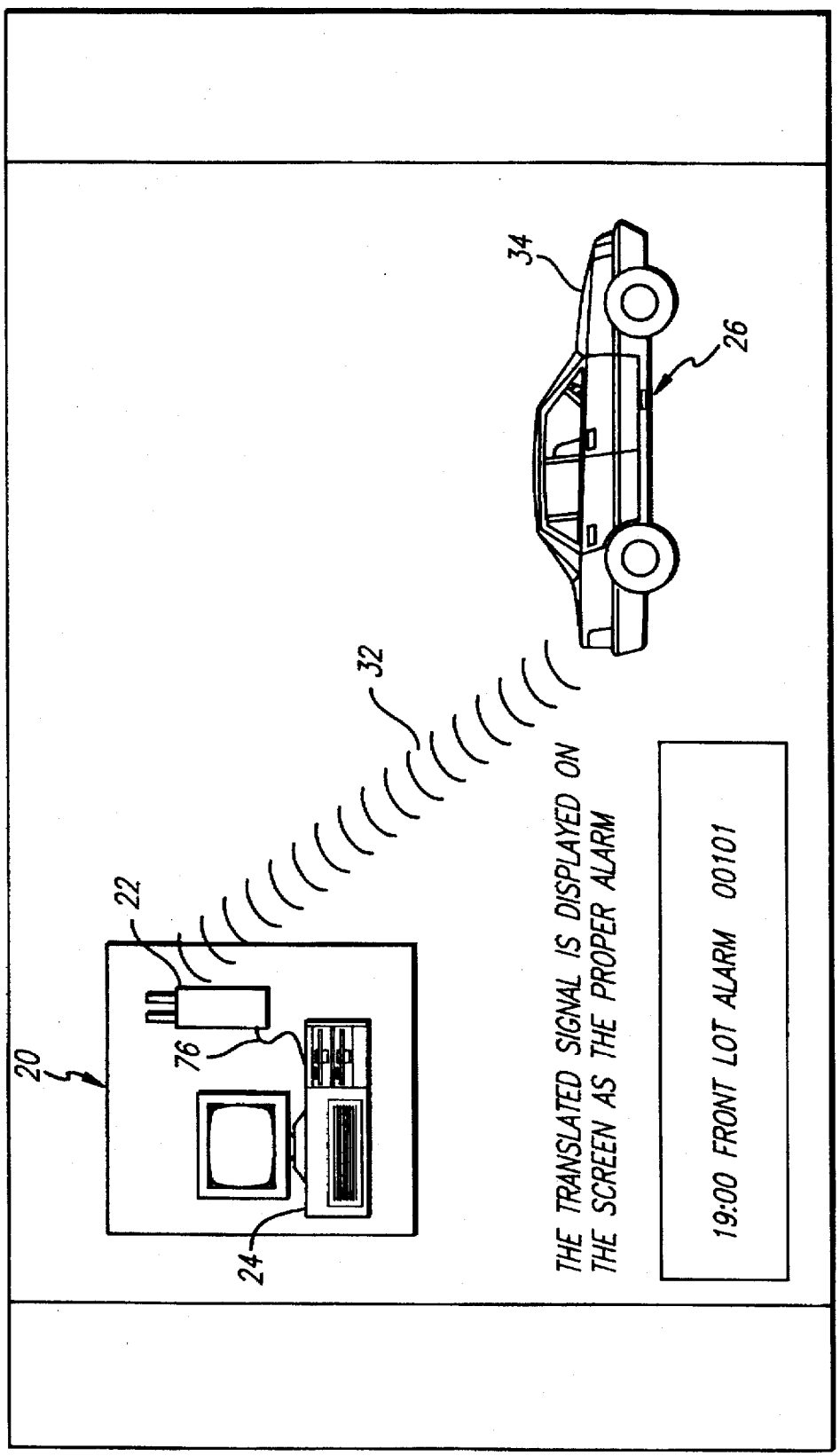
FIG. 5 is a perspective view showing the automobile with the module of FIG. 2 transmitting to a local station.

The transmitter 30 shown in FIG. 4 is responsive to these signals to generate the status signal 32 to be encoded via an encoder 54 (FIG. 1) with a unique identification number associated with the particular module, a battery voltage indicator signal, a shock or vibration flag signal, and a tamper flag signal, to be transmitted to the local station 20 by means of the omni-directional antenna 38 (FIG. 1) as shown in FIG. 5. A clock 56, functioning as a proximity signal generator, is coupled with the transmitter to send periodic status signals at regular intervals, for example, every ten minutes. The transmitter power is set relatively low so as to, within a fairly short distance, exceed the range of the signal generated. For automobile lot monitoring, we have selected a power level which provides a signal level of sufficient magnitude to be sensed for so long as the module 26 in the car 34 remains within a distance of about 300 feet from the local station 20, outside this range an alarm is sounded. The components within the module housing are all miniaturized to maintain the module compact.

A small twelve volt lithium battery 40 (FIG. 1) is used to power the module components. A different voltage could, of course, be used with differently biased module circuitry. The internal power source for the module is less likely to interfere with use and mounting of the mobile unit.

Figure 6:
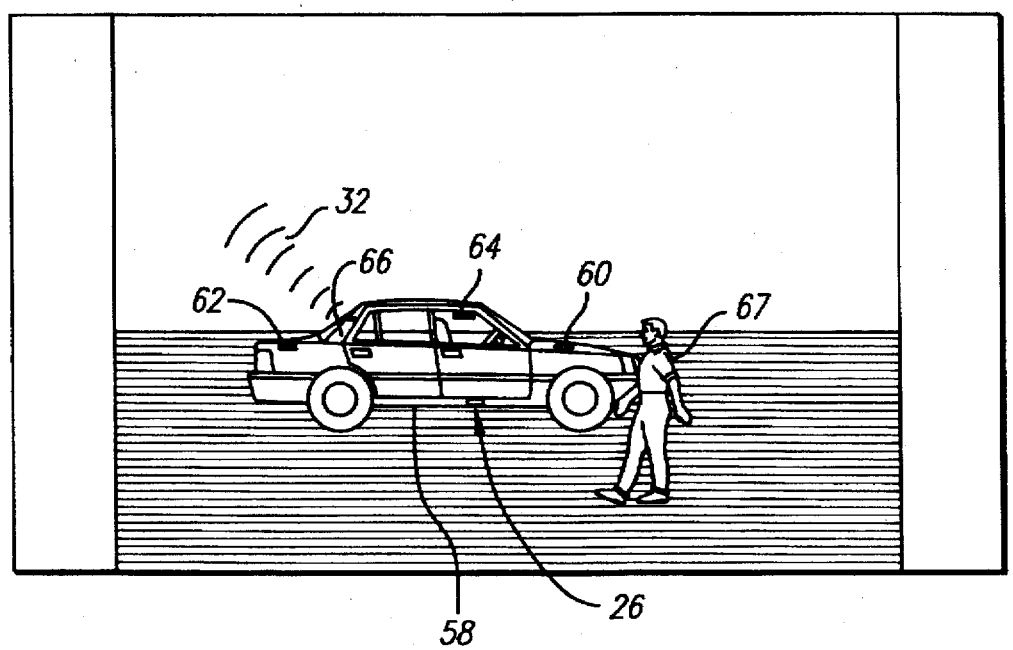
FIG. 6 is a side view of the automobile of FIG. 2 showing the module mounted at various positions thereon.

Referring to FIG. 6, the module 26 is attached to an under surface 58 of a vehicle in solid contact with the chassis so that when the chassis is rocked, the sensor 44 within the module rocks as well. The modules can be magnetically attached to the hood 60 or trunk 62 of the automobile, in the interior or even at a window 64.

The sensor 44 in the module is in the form of a ceramic piezoelectric sensor as shown in FIG. 4. The shock sensor 44 provides roughly two years of sensing powered by the twelve volt source.

A transponder or a repeater 66 can be mounted on the glass windshield of the vehicle to boost transmission power from the transmitter in the module as shown in FIG. 6. Attachment of the module 26 outside an automobile interior gives greater radio frequency carrier wave strength from the module to the local computer. Additional piezoelectric shock sensors can be mounted at different portions of the automobile and coupled to the module using a cable.

Signals 32 are transmitted from the module transmitter to the receiver at the local station using the ultra high frequency (UHF) range as shown in FIG. 6. There may be system components interposed between the module and the local station, such as systems for amplification, analysis, or filtration of the transmitted status signals.

The transmitter 30 in the module 26 and the receiver 22 in the local station 20 (FIG. 1) communicate employing a protocol. The module transmitter and the receiver in the preferred embodiment are available from Inovonics Corporation of Boulder, Colo. under model designation Nos. C211 and C403, respectively.

Figure 7:
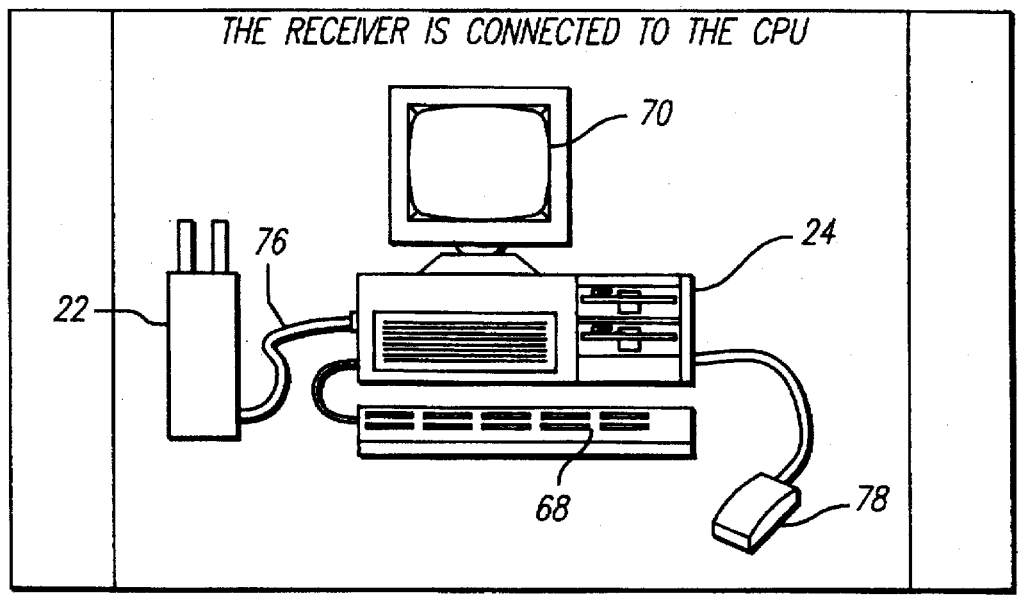
FIG. 7 is a perspective view of a receiver coupled to a computer at the local station shown in FIG. 1.

Referring to FIG. 1, the local computer 24 is fitted with a keyboard 68, a display 70, and a printer 72. The receiver 22 receives the transmitted signals 32 and converts those signals into digital signals recognizable and readable by a personal computer or a microcomputer. The digital signals are delivered to the local computer by a nine pin serial interface RS-232C connector 76 as shown in FIG. 7. The digital data conforms to recognized RS-232 protocol.

The local computer 24 in a preferred embodiment is IBM compatible. For example, a 386 SX with six slots and a four megabyte RAM. The system includes a 2400 baud (bits/second) modem and an 80 megabyte hard drive. The computer includes a 1.44 megabyte, 3.5 inch floppy drive, a mouse port with mouse 78 (FIG. 7), a fourteen inch VGA monitor, one parallel port, and two serial ports.

The local computer 24 contains an operating program to monitor in excess of 2,000 mobile units. The computer is programmed to alert in various modes, including prompting an audible alarm, displaying an alarm message on a computer display screen 70 (FIG. 7), printing a hard copy alert on a printer 72 (FIG. 1), or contacting an alpha-numeric pager 80, and alerting a monitoring station 82 (FIG. 1). This provides for response by management personnel, on-site security, off-site guard service, medical attendants, or police.

The computer is programmed to record the time, according to its internal clock, of receipt of the digital signals from the receiver. The computer includes software to record all signals such as, shock flags, tamper flags, and battery voltage indicator signal appearing encoded status signals. The software generates a complete log of every transaction that occurs during the day and provides summary reports of particular actions, such as instances when a encoded status signal is not received, a highlighting of potential damage to vehicles, and notification that certain vehicles have without prior authorization, been removed from the lot.

The monitoring system is controlled using the computer 24 at the local station. The computer 24 is programmed for recording an identification number of each automobile 34 (FIG. 5) to be monitored, an identification number of the module 26 attached to the automobile 34, the price of the automobile, the date of acquisition, whether the automobile is presently in custody, the zone where the automobile is physically located within the lot, a description of the automobile, the serial number of the automobile, ownership information of the automobile, and authorized possessors of the automobile.

The computer 24 is operated by a program to analyze and respond to the signal received from the receiver 22 (FIG. 1). The operating system program functions as a decoder to decode the identification number of the transmitting module signals such as shock, tamper, and battery voltage indicator flags from the receiver signal. The operating system also functions as a discriminator for correlating the identification number with an associated module and determining vehicle information from the module identity. The operating system also includes a detector function to detect the absence of a periodically transmitted signal from a module. The computer 24 at the local station thereby decodes alarm flags and detects the absence of such a receiver signal when expected. Referring to FIG. 8, the local computer 24 polls 86 its RS-232 input for signals 74 (FIG. 1) from the receiver 22. The receiver signal will be encoded with an identification number of the transmitting module and up to three flags 88. The computer determines the module identification number from the identification code in the receiver signal 90. The module identification number is stored in memory 92. Zone information describing the location of the automobile is determined from the module identification number and is stored in memory 94. The signal is analyzed for the presence of a shock flag 96. If one exists, the occurrence is stored in memory 98. The local computer determines if the alert for shocks has been qualified 100. If so, the local computer examines for tamper flags 102. If not, an alert routine is initiated 104.

If there is no shock flag or if such shock flags is qualified, the local computer analyzes the receiver signal for tamper flags 102. If there is a tamper flag, such flag is stored in memory 106, and the alert routine is initiated 104.

If there is no tamper flag in the receiver signal, the computer analyzes the battery flag in the receiver 108. It is determined from this flag by the computer whether the battery lifetime remaining is significantly low to warrant replacing the battery. If so, the condition is stored in memory 110 and the alert routine is initiated 104.

If the low battery flag indicated satisfactory power lifetime for the module, the local computer continues to poll its RS-232 input for the presence of another signal from the local receiver 86.

Figure 9:
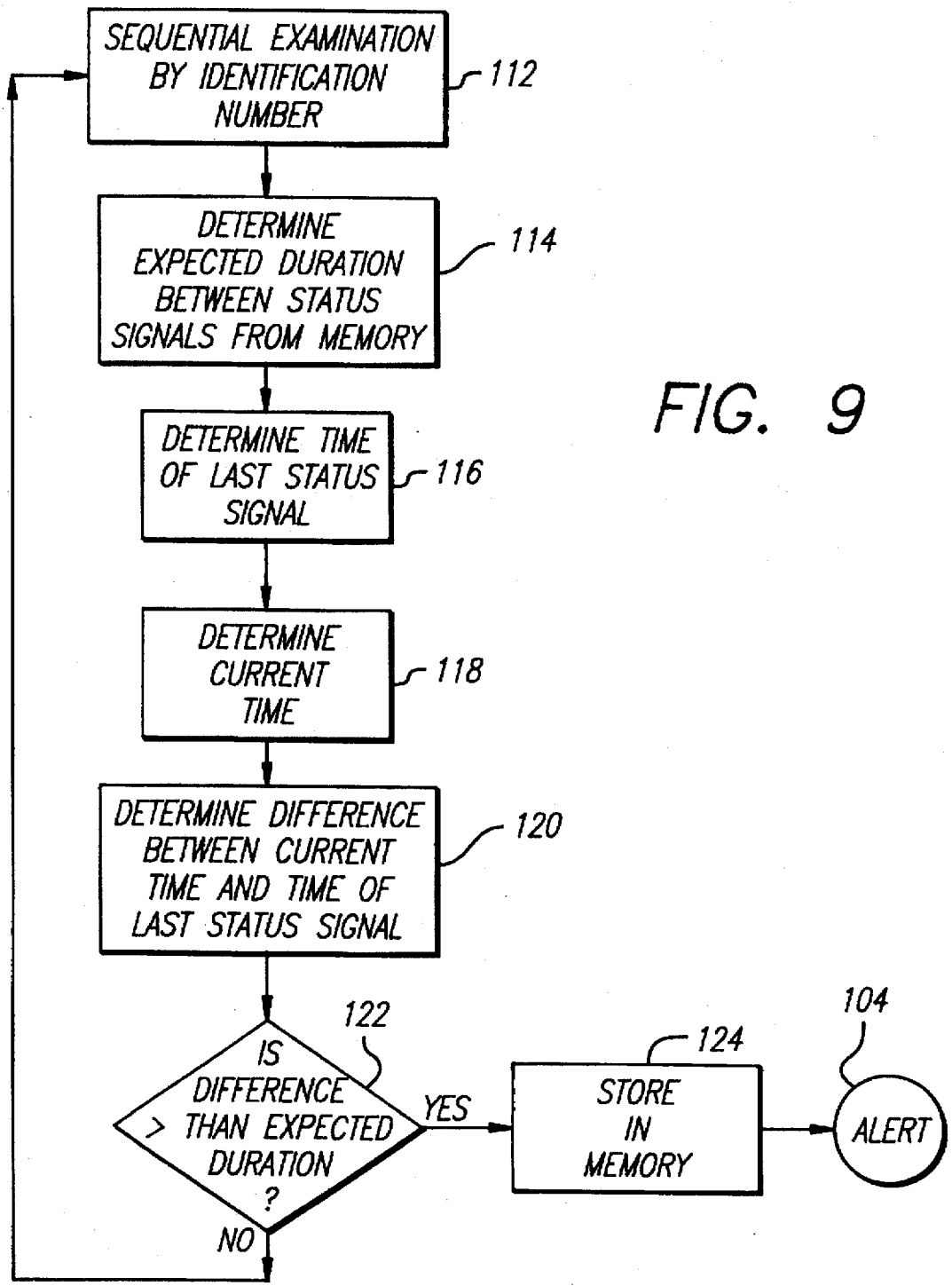
FIG. 9 is a flow chart of a computer routine to determine the proximity of the automobile performed by the computer shown in FIG. 7.

Concurrently with the analysis of the receiver signal in the above described routine, the local computer 24 (FIG. 1) monitors the periodic receipt of receiver signals 74 (FIG. 1) from all of the modules attached to automobiles. Referring to FIG. 9, the local computer accesses its memory records sequentially to identify a module identification number 112. It accesses its memory to determine the expected duration between status signals from the particular module, usually 10 minutes 114. It determines from memory the time the last status signal was received 116. The computer determines the current time according to its internal clock 118. The computer is programmed to determine the difference between the current time and the time the last status signal was received 120. The computer calculates whether this difference is greater than the expected duration of 10 minutes 122. If so, this is stored in memory 124 and the alert routine is initiated 104. This analysis is repeated sequentially for each module identification number stored in memory 112.

Figure 10:
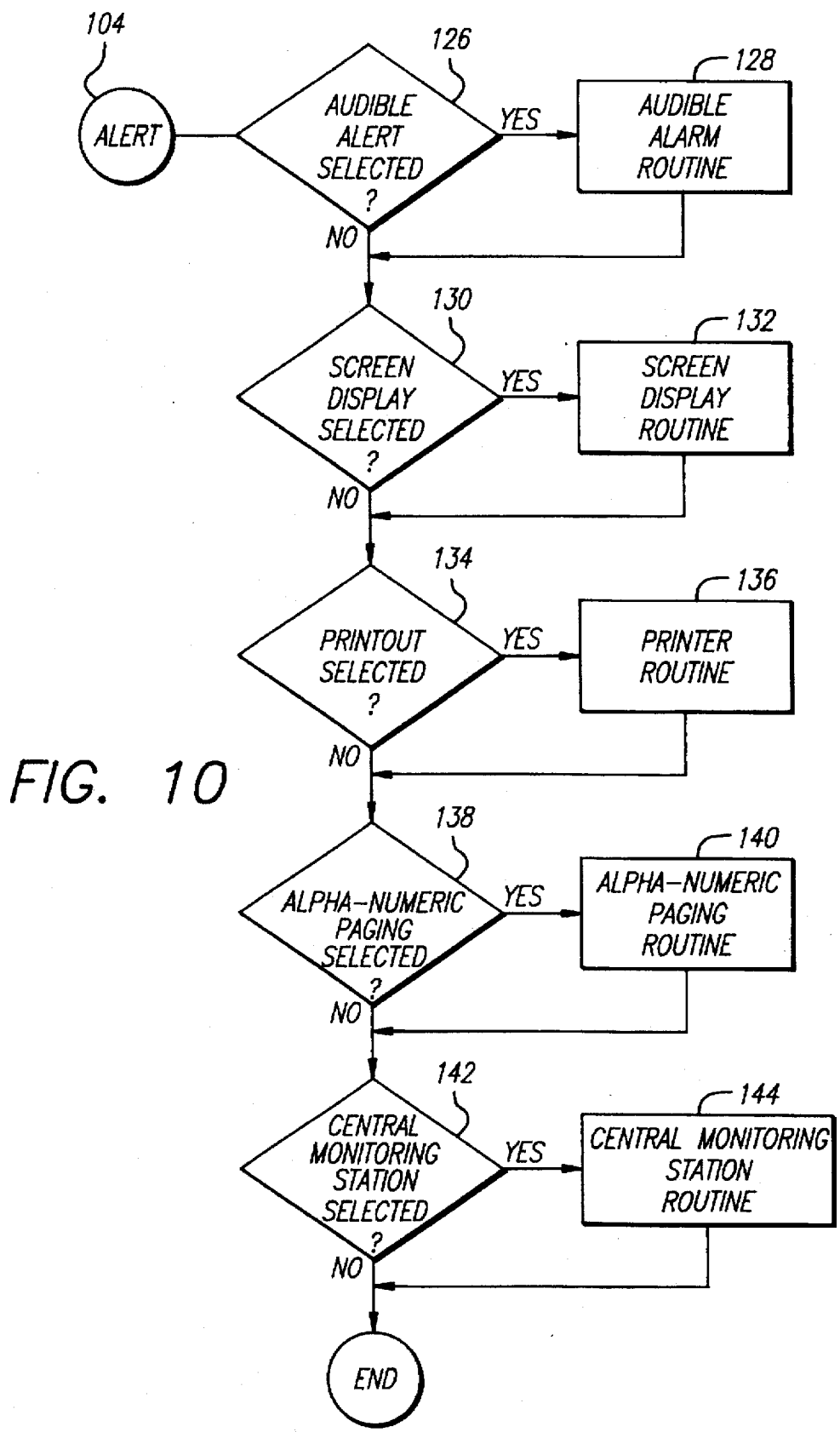
FIG. 10 is a flow chart of an alert routine performed by the computer shown in FIG. 7.
Figure 11:
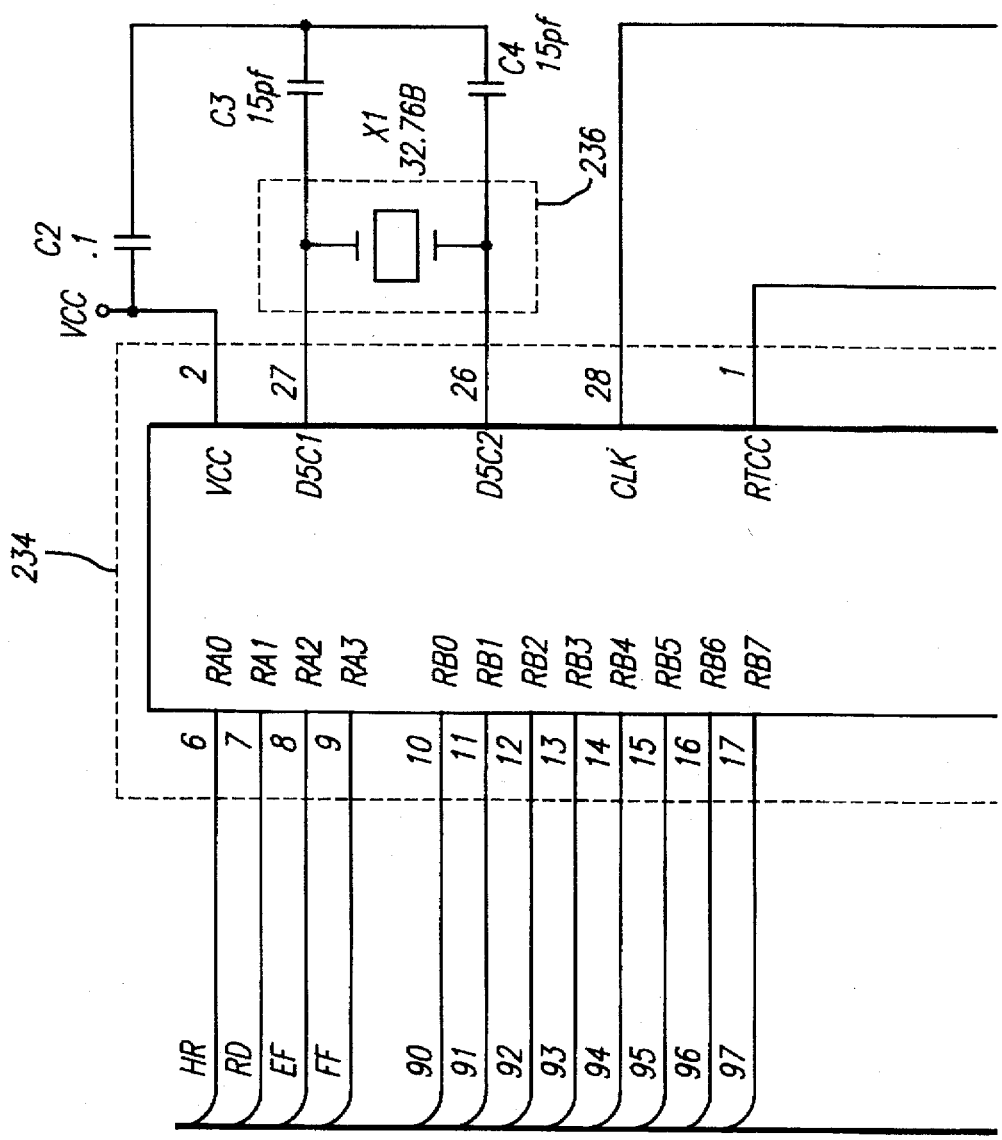
Figure 11:
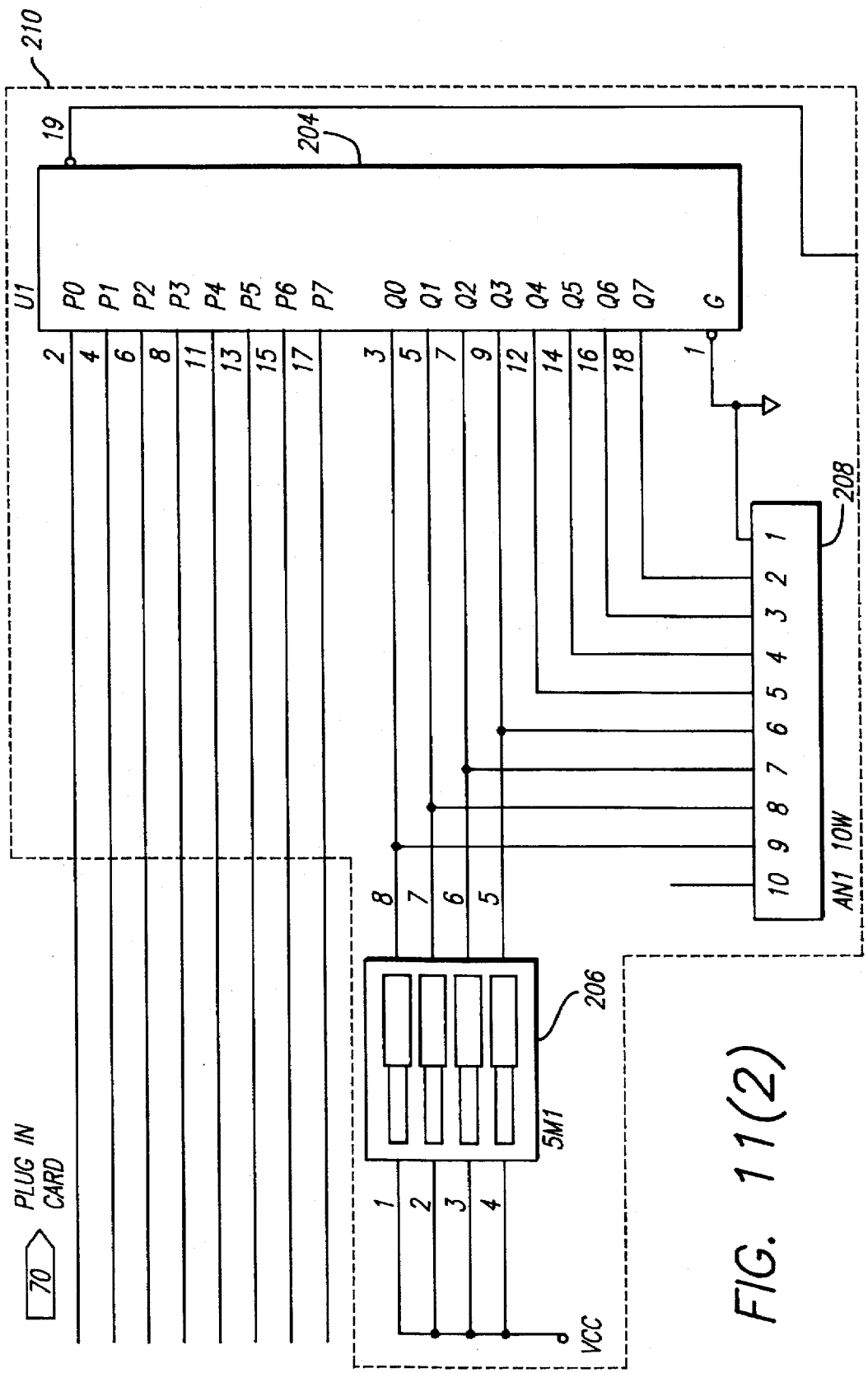
Figure 11:
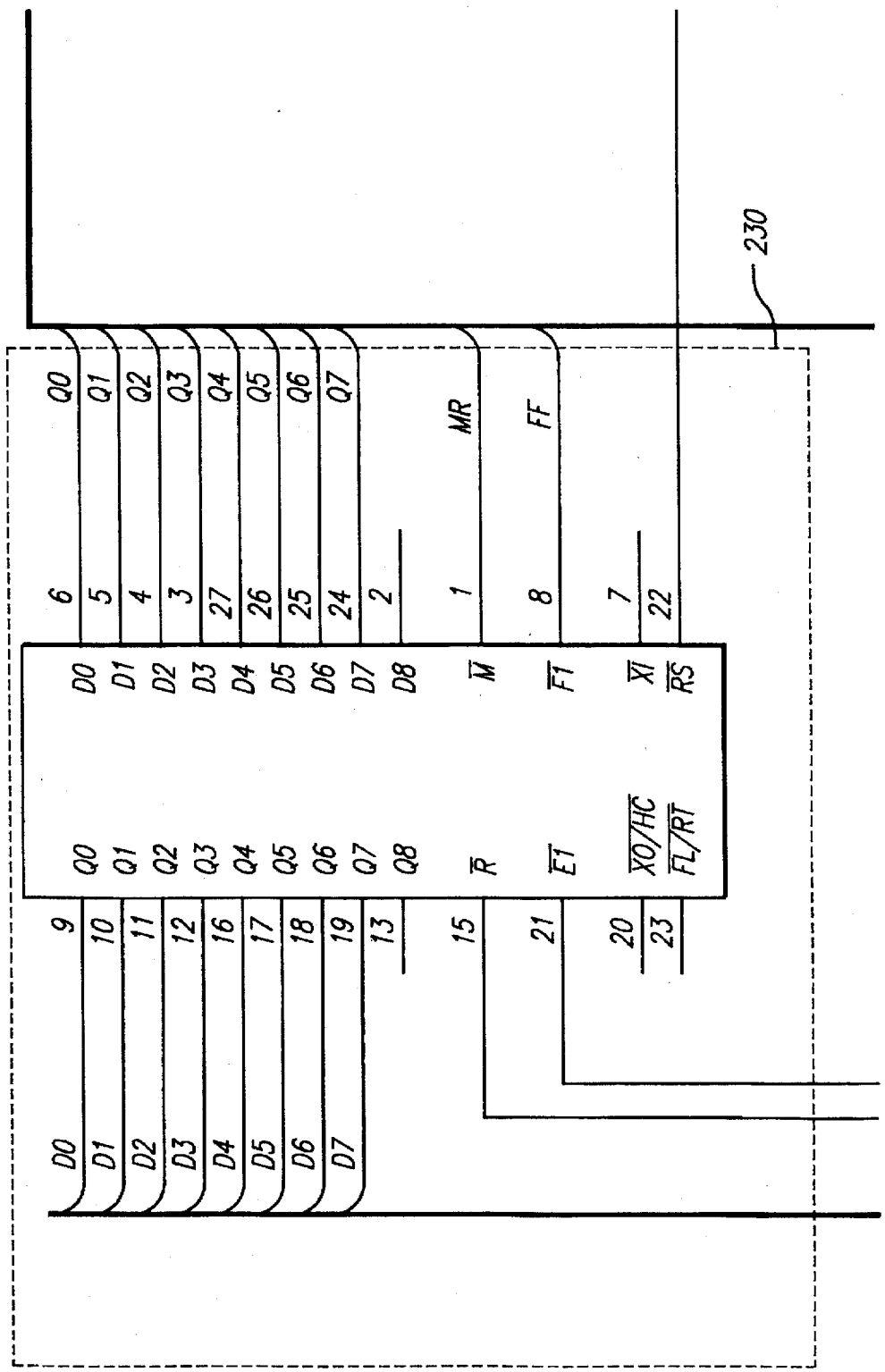
Figure 11:
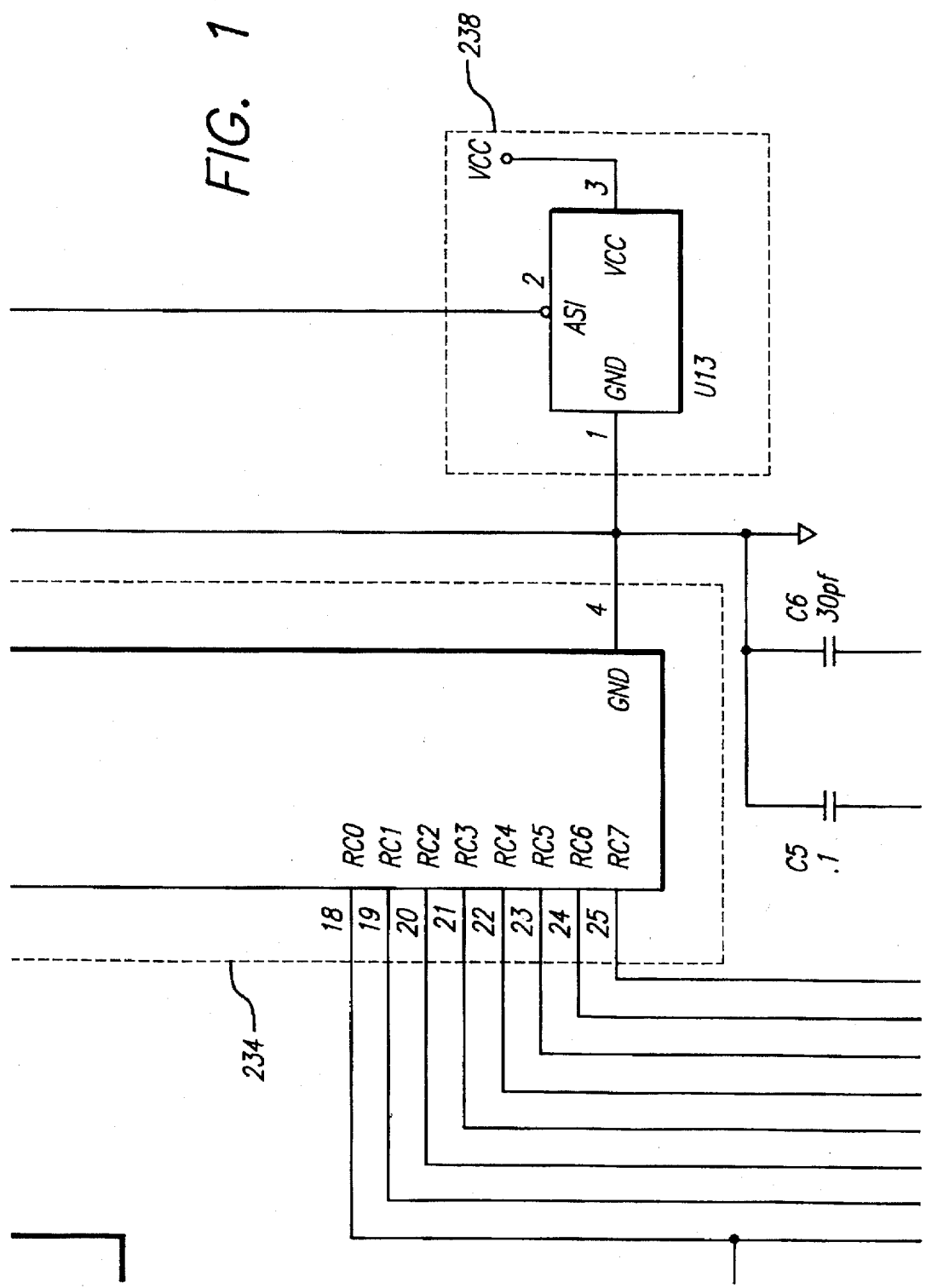
Figure 11:
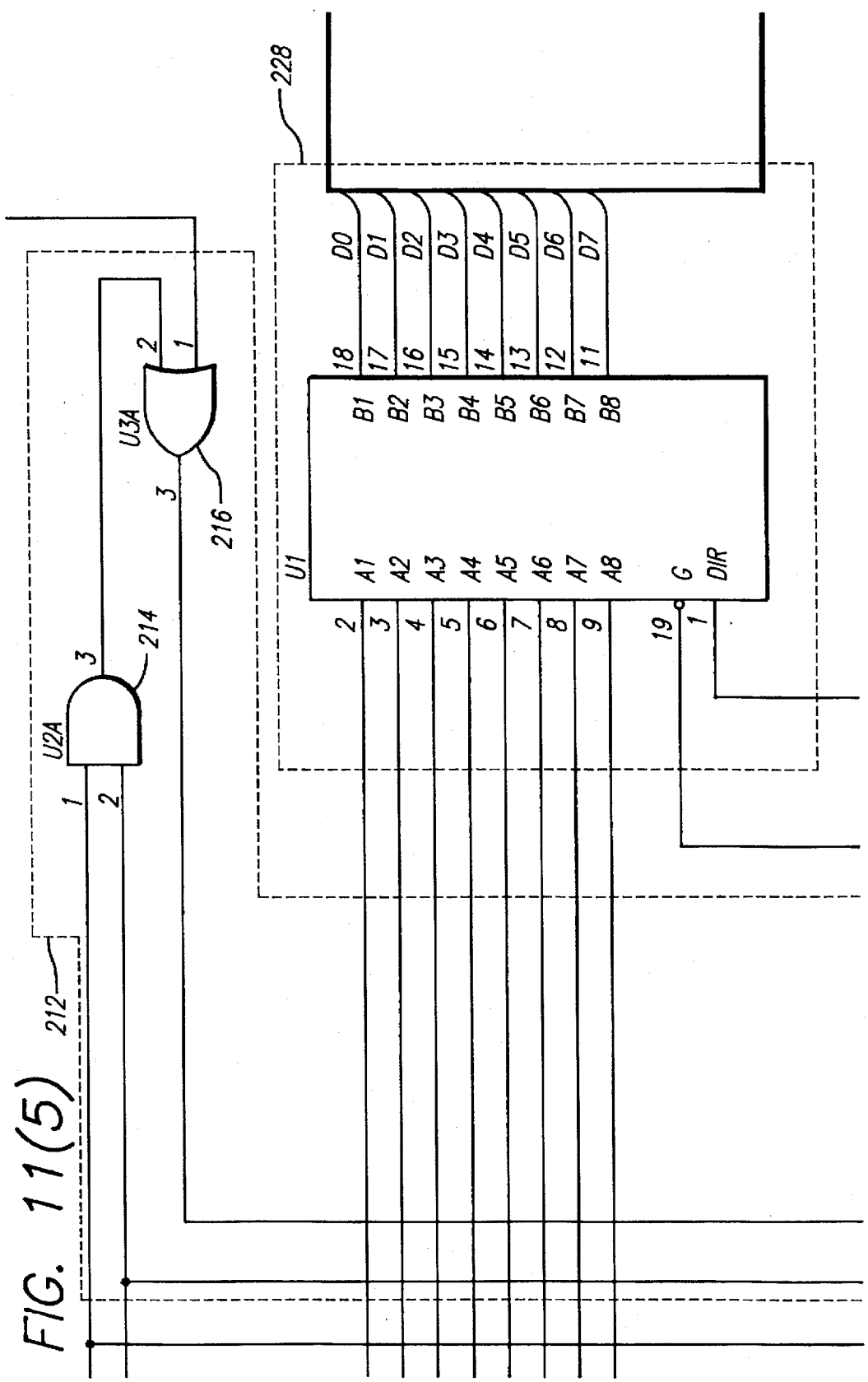
Figure 11:
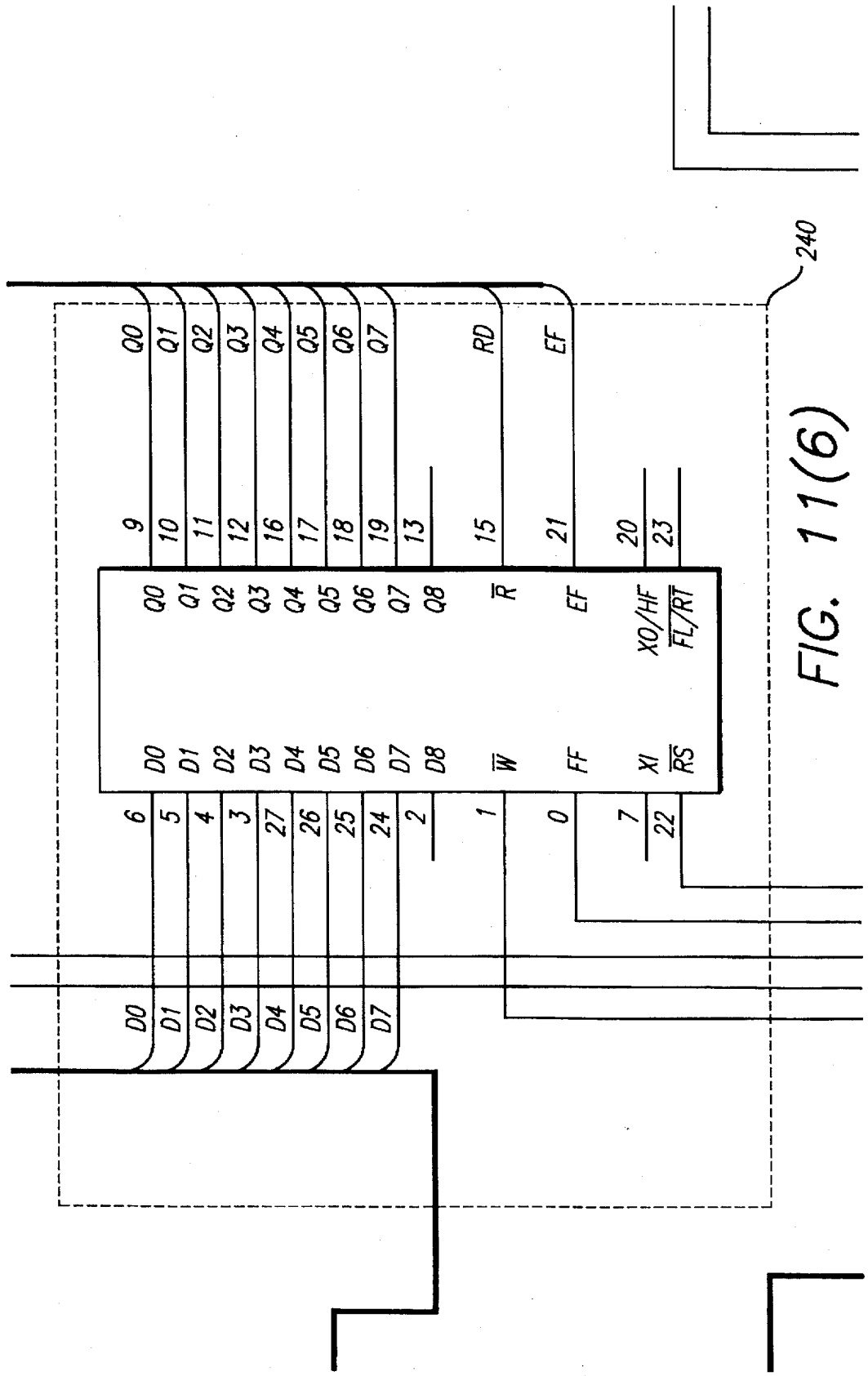
Figure 11:
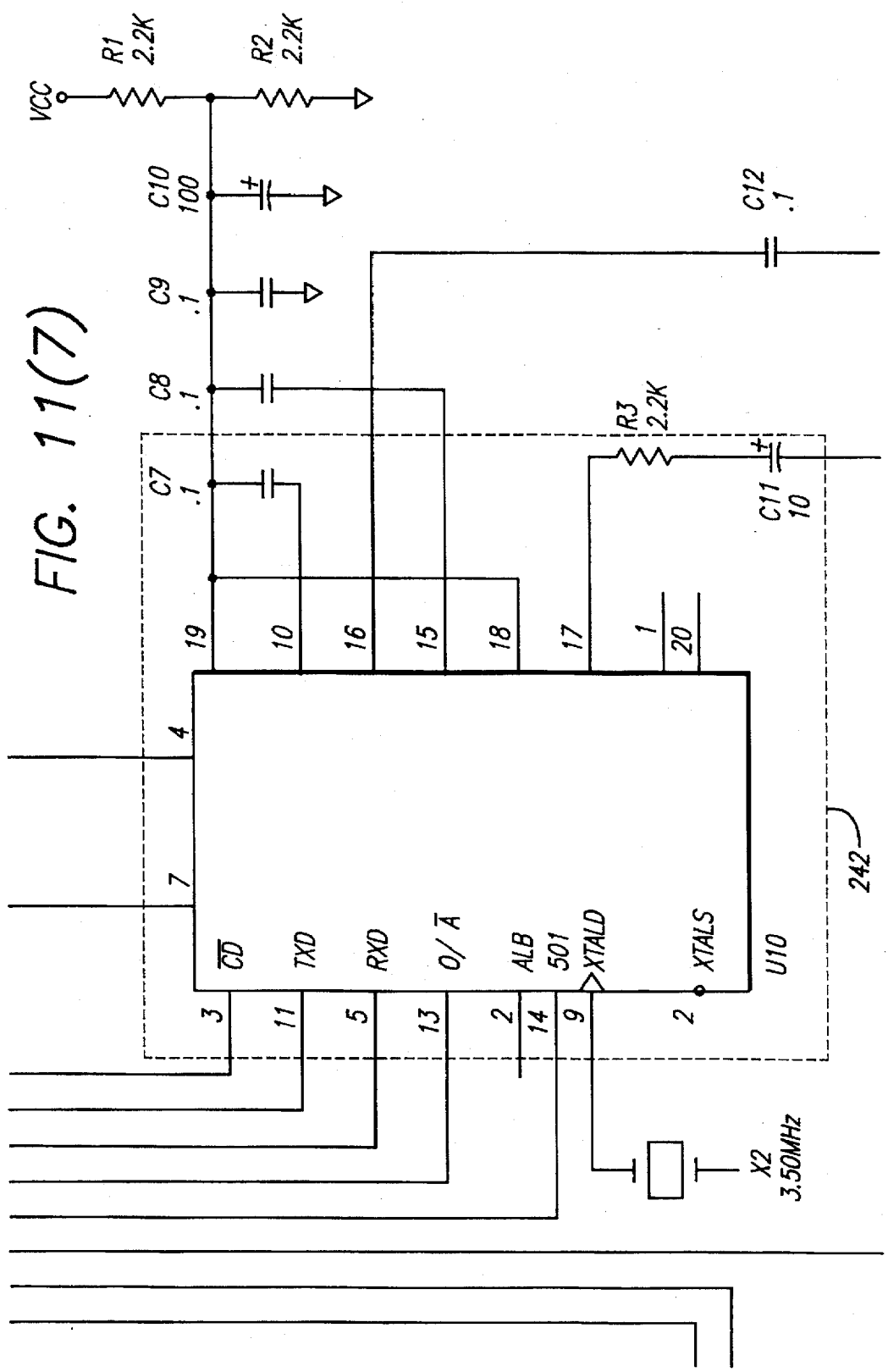
Figure 11:
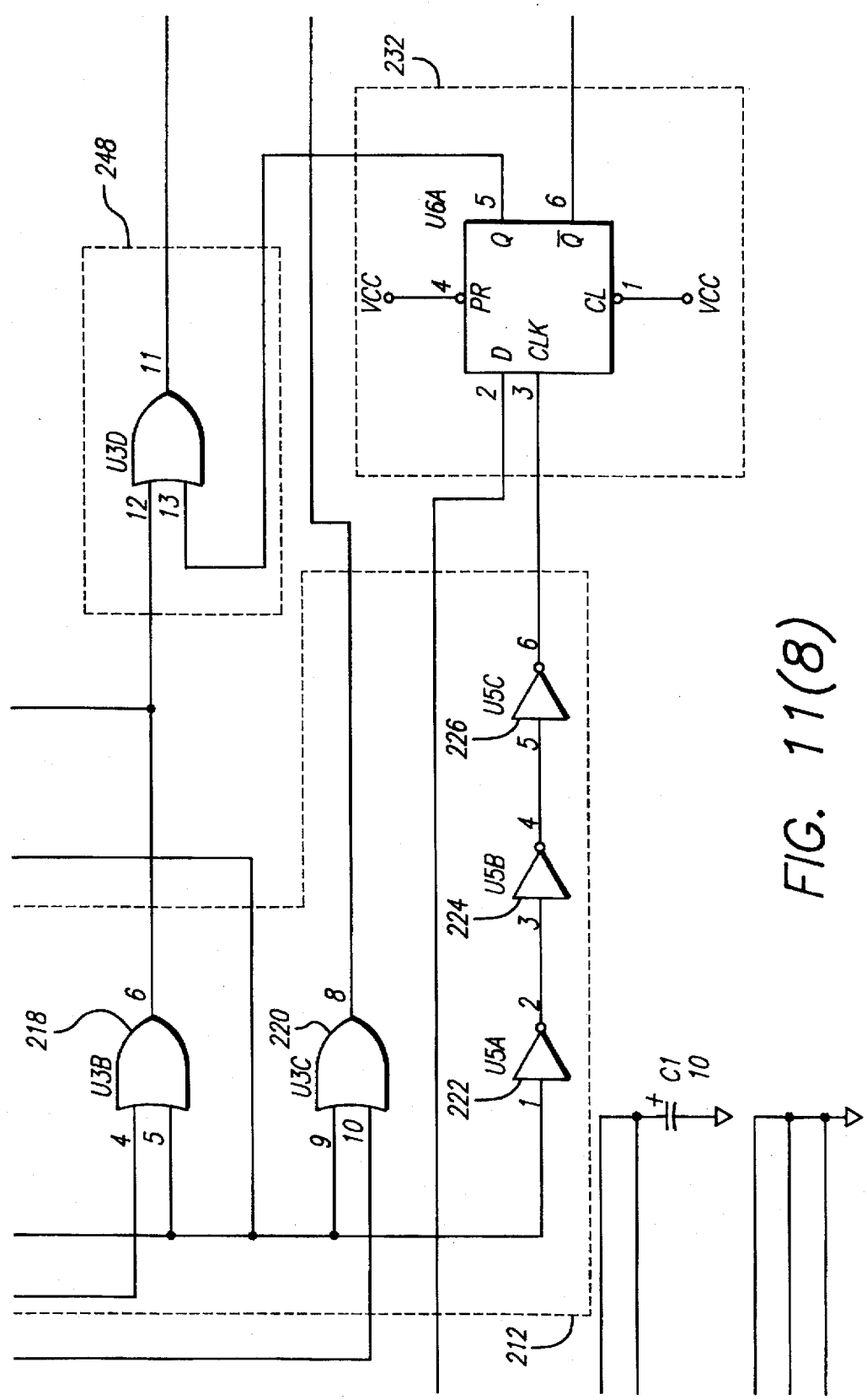
Figure 11:
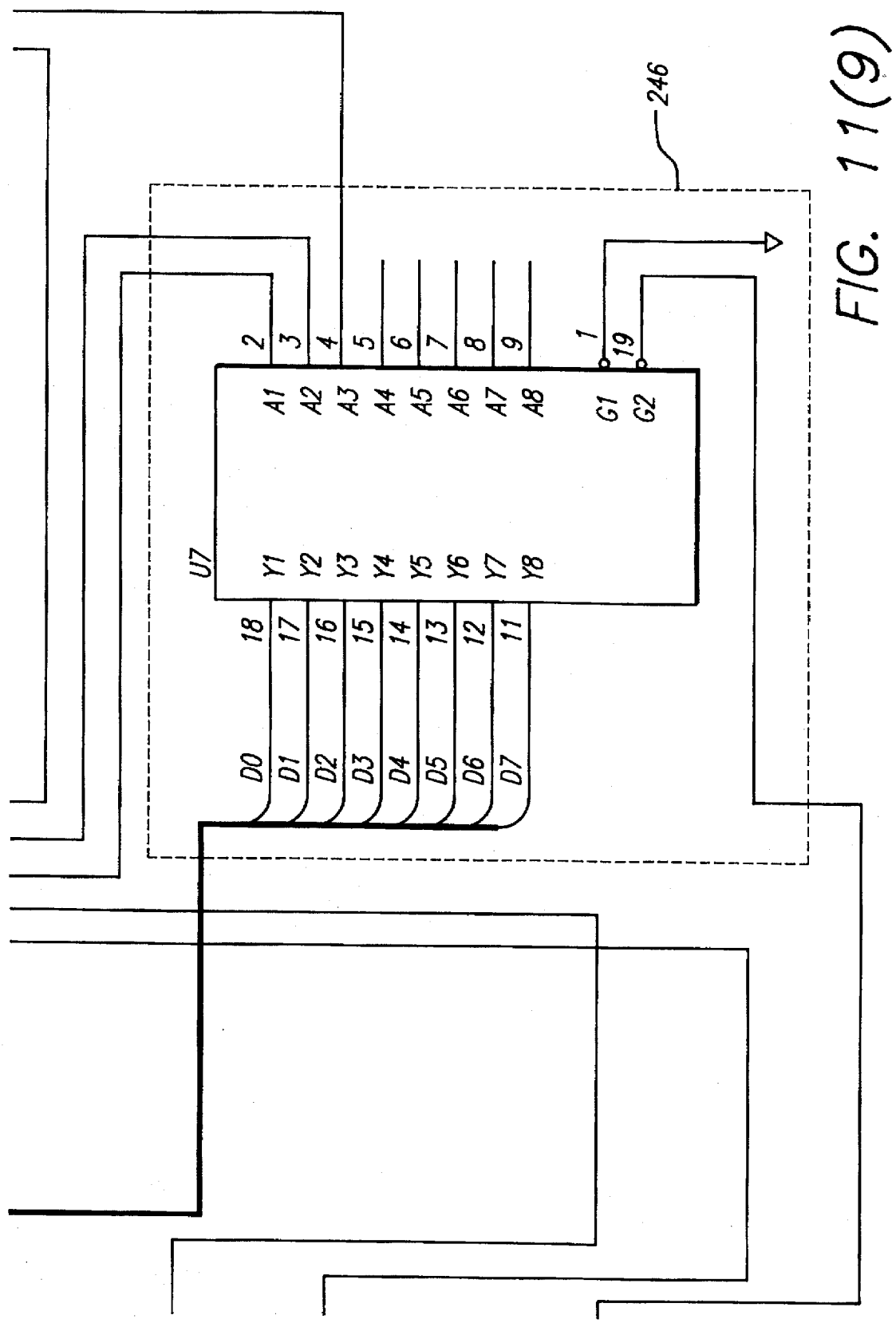
Figure 11:
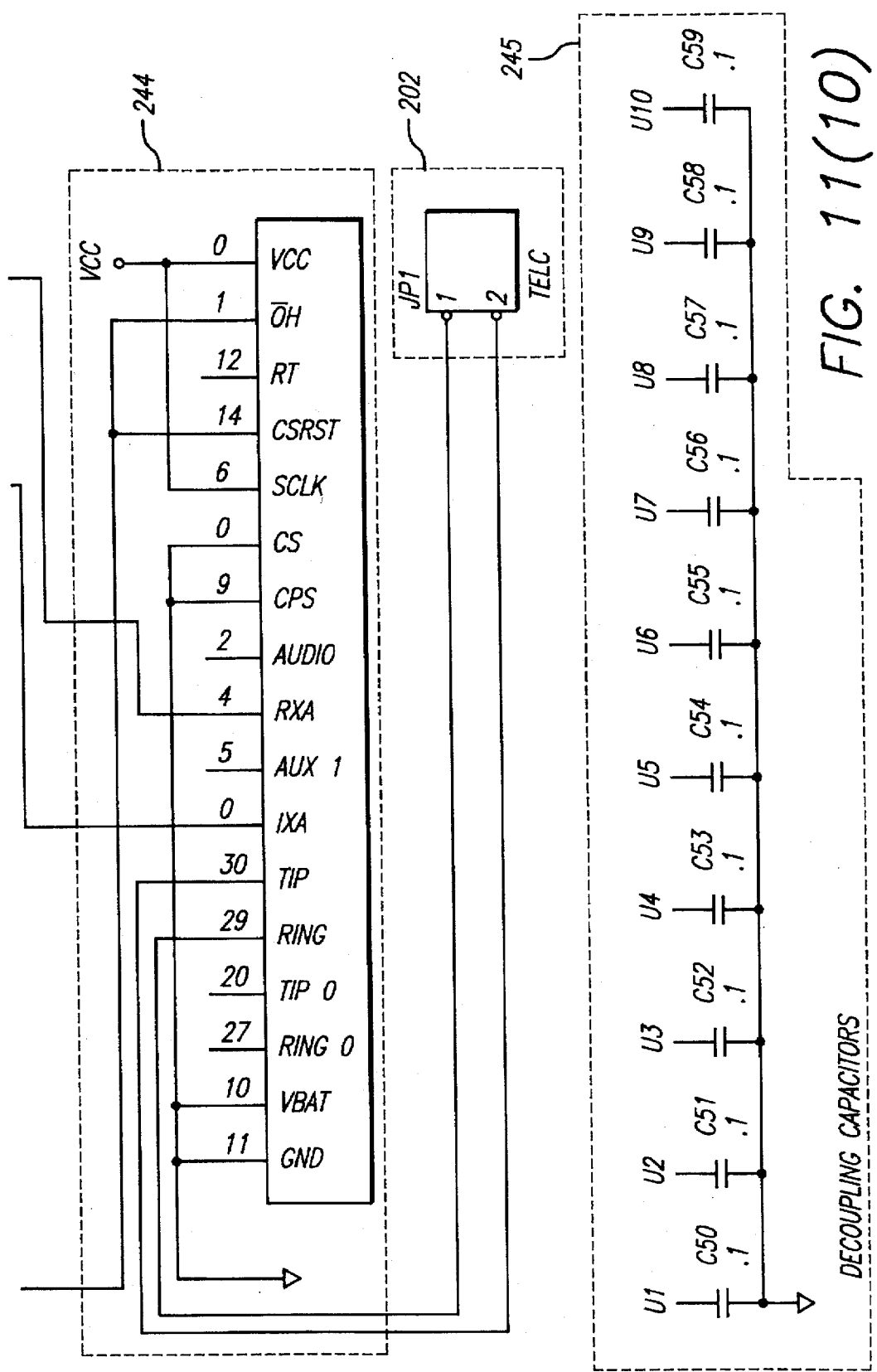

As shown in FIGS. 8 and 9, the alert routine is initiated by an unqualified shock flag, a tamper flag, a low battery signal, or the absence for a set period of time of a status signal. The user programs the local computer with various modes of response to an alert. The alert options of the monitoring system are an audible alert at the local station, screen display of an alert message, an alarm printout from the printer, an alert to an alpha-numeric pager, or an alert to a central monitoring station. Assuming the user selects all these options, the computer is controlled by the program to respond as shown in FIG. 10. Referring to FIG. 10, if an audible alert has been selected 126, a loudspeaker is driven at the local computer station 128. If the user has selected screen display of the alarm 130, the computer initiates a message on the computer display screen 132. If a printout from a printer has been selected 134, a printed message alerts the user 136. If the alpha-numeric paging option has been selected by the user 138, a pager is contacted 140. If an alert to a central monitoring station was selected 142, the monitoring station is contacted 144. The central monitoring station responds according to its agreement with the operators of the local automobile dealership station.

The local computer 24 is fitted with a dialer card 200 in an internal slot as shown in FIG. 1. The dialer card is coupled to a telephone line using a standard RJ-11 telephone coupler 202, shown in FIG. 17. The dialer card interfaces the local computer with the central monitoring station 82 using telephone lines and without the need for a modem. If the user has selected contacting the central monitoring station as the response to an alert, the local computer dials the central monitoring station using the dialer card. The dialer card functions as a communications buffer between the local computer and the central monitoring station. The local computer communicates asynchronously with the dialer card and the dialer card communicates asynchronously with the central monitoring station. Handshaking protocol is required before data can be transmitted between the local computer and the dialer card and between the dialer card and the central monitoring station. The dialer card initiates communication with the central monitoring station using a 2300 Hz handshaking tone. Data is communicated to the central monitoring station using a single 1800 Hz tone. The length of the data tone varies to communicate different signals.

The dialer card 200 appears as two addresses on the bus of the local computer 24. The base address is selectable as 300 to 3F0 hexadecimal. The data register is located at the base address. The status register is located at the address one increment above the base address. The dialer card 200 is accessed through a command to these addresses. The computer 24 reads data from the dialer card and writes data to the dialer card using the data register.

The status register communicates information about the dialer card to the local computer. It is an eight bit register with two flag bits. Bit 0 is a flag. It is set to zero if the dialer card memory to which the computer writes data is full. Bit 1 is a flag. It is set to zero if information to be read from the card is present. An address decoder 204 determines if data from the computer is meant for the card. The address decoder 204 is coupled to a DIP switch 206 and a resistor network 208 forming an address decoder network 210 whereby the addresses of the card may be selected and changed. The address decoder network 210 determines to which register, either the data register or the status register, the computer 24 is attempting to communicate.

The address decoder network is coupled to a logic network 212. The logic network includes one "or" gate 214, and three "and" gates 216, 218, 220 connected in series with three inverting amplifiers 222, 224, 226, respectively. These components determine whether the computer is reading from or writing to the data register. When the computer 24 is in a mode to communicate with the central monitoring station 82 (FIG. 1), the logic network 212 is operative to control a bi-directional data latch 228 to pass data to an input, which is an asynchronous data buffer, FIFO 230. The bi-directional latch 228 is responsive to the logic network 212 and a flip-flop 232 controlling both the bi-directional latch 228 and the input FIFO 230, and operative to pass data from the local computer 24 through the bi-directional latch 228 to the input FIFO 230. Data in the input FIFO 230 is available for asynchronous communication to a microcontroller 234.

The microcontroller 234 has its own clock, in the form of a resonator 236, and a power supply 238. The microcontroller is an integrated processor functioning as firmware for the dialer card. It includes RAM and ROM, some in the form of EEPROM. It is programmed with stored routines comprising an industry standard telephone tone protocol. It is coupled with the input FIFO 230 and an output FIFO 240, which is an asynchronous communications buffer, to communicate with the local computer 24.

The microcontroller 234 is coupled to a tone encoder/decoder 242. The microcontroller 234 takes data from the input FIFO 230 using asynchronous handshaking protocol and controls the tone encoder/decoder 242, in accordance with routines stored in the microcontroller, to generate tones to be passed to the central monitoring station 82 (FIG. 1). The tone encoder/decoder 242 is coupled to a telephone hybrid circuit 244 meeting FCC standards. This hybrid device 244 is coupled to the standard male RJ-11 telephone coupler 202 through which the central monitoring station 82 (FIG. 1) is dialed. The components of the dialer card electrical circuit are protected by decoupling capacitors 245.

The central monitoring station 82 asynchronously communicates with the local computer 24 through the dialer card 200. The central monitoring station 82 passes industry standard tones to the dialer card 200 through the telephone coupler 202. The tones are passed through the telephone coupler to the hybrid device 244 and therethrough to the tone encoder/decoder 242. The tone decoder 242 is responsive to the tones and operative to pass data to the microcontroller 234 in a form recognizable by the microcontroller. The microcontroller 234 passes data to the output FIFO 240 which is coupled to the bi-directional latch 228. Presence of data from the central monitoring station 82 through the microcontroller 234 and in the output FIFO 240 is sensed by an eight bit status latch 246. The status latch 246 indicates data present from the microcontroller 234 in the output FIFO 240 for the local computer 24. This is shown by status register bit one equalling zero. The local computer 24 reads data at the status register to determine if data are present from the microcontroller 234 for the computer 24. The address decoder 204 and the logic network 212 determine if the local computer 24 wants to read data at the data register at the base address. The logic network 212 and the flip-flop 232 gate data from the output FIFO to the local computer. The flip-flop 232 is responsive to control the bi-directional latch 228 to pass data from the output FIFO 240 to the local computer 24.

The status latch 246 indicates if the memory on the card to which the local computer 24 will pass data is full. Full memory is shown by the status register bit zero equalling zero. If the local computer 24 is attempting to write to the dialer card, the local computer 24 reads data at the status register. If the status register indicates that the memory is not full, then the local computer 24 writes to the data register at the base address. The logic network 212 and the flip-flop 232 control an address latch 248 to gate data to the input FIFO 230.

Commands from the local computer are clocked through the bi-directional latch 238 to the input FIFO 230. The microcontroller 234 handshakes with the input FIFO 230 to receive the commands. The microcontroller 234 delivers tones corresponding to the commands to the central monitoring station 82 (FIG. 1).

Figure 17:
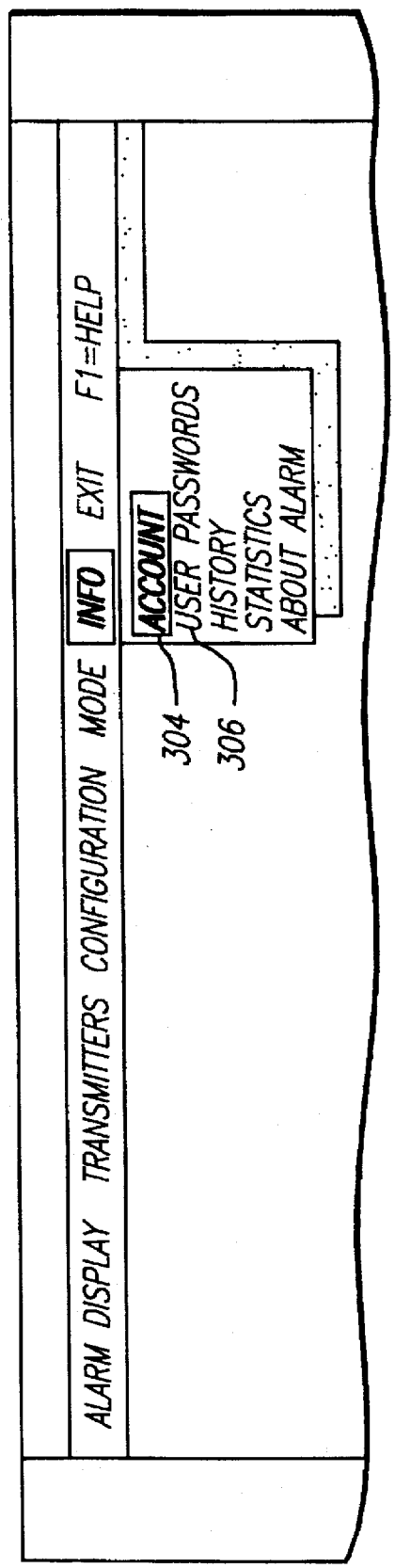

The central monitoring station 82 communicates data in the form of tones to the tone decoder 242 (FIG. 17). The microcontroller 234 passes commands to the output FIFO 240 responsive to data signals from the tone decoder 242. The flip-flop 232 and the status latch 246 are responsive to the presence of data in the output FIFO 240 and operate to clock data through the bi-directional latch 228 to the local computer 24 (FIG. 1).

The commands controlling the dialer card 200 written to the dialer card from the local computer 24 (FIG. 1) are:

0F=Beginning marker of a central monitoring station telephone number.

1F=Beginning marker of an account number denoting the automobile dealership.

2F=Beginning marker of a zone number describing the location of the automobile.

3F=Request the central station telephone number.

4F=Request the last account number used.

5F=Request the last zone number used.

6F=Reset the FIFO's.

7F=Call the central monitoring station.

0F=End marker at end of all transmissions.

These commands are passed through the input FIFO to the microcontroller and are recognized by the microcontroller.

Examples of commands to the dialer card from the local computer in which digit zero=0A:

To dial the telephone number of the central monitoring station, for instance 1 (915)520-7404, the local computer sends: 0F 01 09 01 05 05 02 0A 07 04 0A 04 0F to the base address.

To send account number 1234, the local computer sends: 1F 01 02 03 04 0F to the base address.

To send zone number 01, the local computer sends: 2F 0A 01 0F to the base address.

To request the central station telephone number, the local computer sends: 3F to the base address. The local computer polls status register bit 1. If zero, it reads at the base address.

To request the last account number used, the local computer sends: 4F to the base address. The local computer polls status register bit 1. If zero, it reads at the base address.

To request the last zone number used, the local computer sends: 5F to the base address. The local computer polls status register bit 1. If zero, it reads at the base address.

When reading at the base address, the local computer continues reading until it reads FF.

An example of an alert from the local computer 24 having account number 1234 to the central monitoring station 82 for an automobile and module located in zone number 01:

The local computer sends: 1F 01 02 03 04 0F to the base address.

The local computer sends: 2F 0A 01 0F to the base address.

The local computer sends: 7F to the base address. The local computer polls status register bit 1. If zero, it reads at the base address for a status report.

The microcontroller 234 of the dialer card 200 initiates this task and communicates such a status report back to the local computer 24 through the output FIFO 240 regarding the current status of the task. The type of pre-programmed stored communication functions that the microcontroller communicates to the local computer are:

F1=Indicates dialling is occurring

F2=Handshake with the central monitoring station

F3=No handshake with the central monitoring station

F4=Kiss off (acknowledges receipt of tone by central monitoring station)

F5=No kiss off

F6=Call completed OK! (Go to wait for another alarm command from the local computer)

F7=Call not completed (Pause a few seconds and then send 7F again).

The dialer card informs the local computer through these reports that the task commanded is being acted upon. These commands are placed in the output FIFO 240 to be passed to the local computer.

In operation, an automobile dealership user of the system would assemble the automobiles 34 (FIG. 5) to be monitored and the modules 26 to be mounted thereon. An account setup routine of the computer operating system prompts the user to enter the identification number of each respective automobile 34 and to enter the identification number, for instance No. M73 shown in FIG. 3, imprinted on the housing 36 of each module 26 to be attached to the respective automobile 34. Zone number information describing the location of the automobile on the sales lot is entered during this setup procedure. A user couples the receiver 22 (FIG. 1) to the data port 51 (FIG. 3) on the module to configure the module for operation using an umbilical cord (not shown). The user is prompted by the operating system of the computer to enter at the keyboard 68 (FIG. 7) the duration between proximity signals from the transmitters of a selected module. The user is prompted by a visual display 70 (FIG. 7) of the computer 24 to enter the unique identification number that will be transmitted with each status signal from the module. The user magnetically affixes the modules 26 to the underside of each respective automobile 34 (FIG. 2) depressing the spring loaded switch 48. The user slides activation switch 52 shown in FIG. 3 on the module to an activated position which energizes the module circuits. The shock and tamper sensors 44, 46 (FIG. 1) are armed. The proximity signal generator 56 begins to generate periodic signals. The transmitter 30 is powered to encode 54 and transmit status signals.

Figure 12:
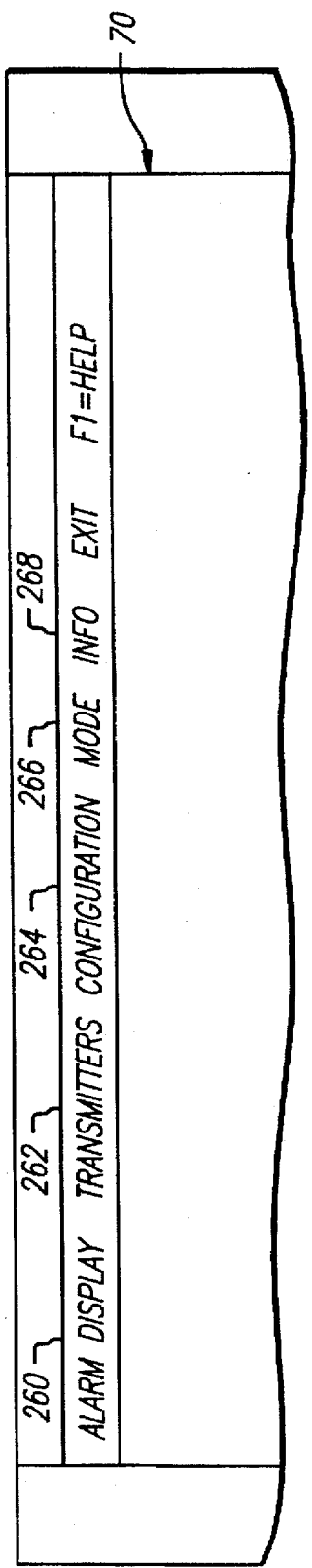
FIGS. 12–17 are front views of a computer display screen shown in FIG. 7 at the local station through which an operator can configure the monitoring system.

The user now configures the system by entering operating data in the computer 24 through a mouse and windows type display of the type shown in FIG. 12. The user selects a variety of system options and characteristics using the mouse 78 (FIG. 7) to control a cursor to pull down window images on the computer display screen 70 as shown in FIG. 7. Referring to FIG. 12, the user can control from a screen menu the mode in which alarms are displayed 260, enablement of the transmitters in a module 262, the type of alarm responses 264, day or night mode operation of the system (shock flags are qualified in day mode) 266, and the account number assigned to the system 268.

Figure 13:
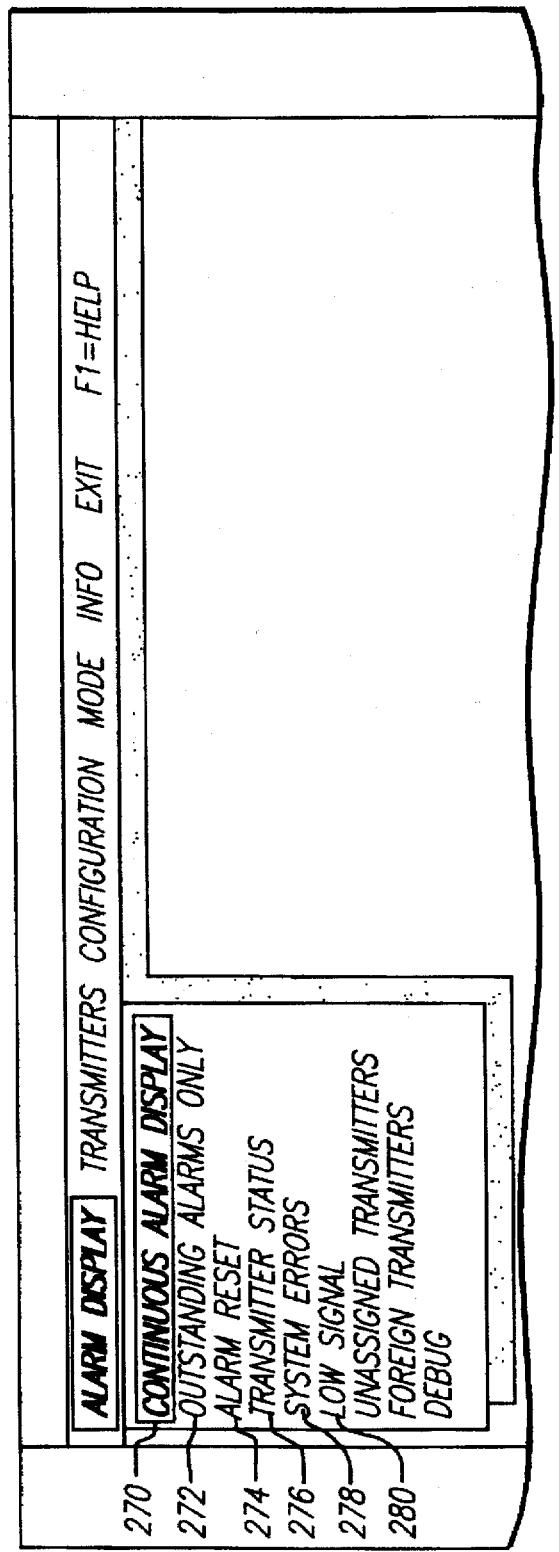

As shown in the format of FIG. 13, the computer is programmed so the user can elect to continuously display all alarms actuated 270 or those alarms to which the user has not entered a response 272. The user can reset alarms through the computer 274. The program provides means whereby the user can check the status and record of activity of various transmitters 276, for instance the number of shocks in one day, look for system errors 278, or identify modules emitting below power status signals 280.

Figure 14:
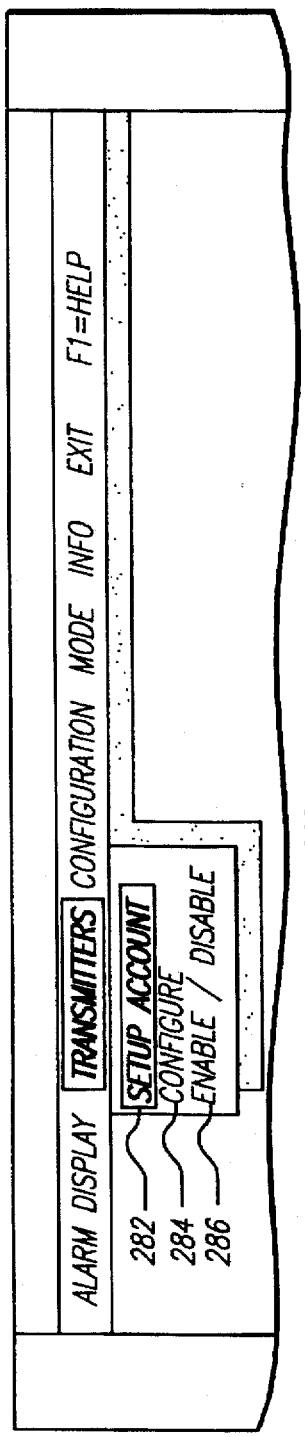

The account setup routine described above is controlled through the computer 282 as illustrated in FIG. 14. The module identification number correlated with the vehicle identification information can be changed 284, for instance if a new module is attached to an automobile. The respective module transmitters transmit encoded status signals corresponding to the identification number on the module and a timer signal generator 56 (FIG. 1) is programmed to transmit status signals at particular periodic durations as for instance 10 minute intervals. Alerts as a result of signals from a particular module can be disabled by keyboard entry 286.

Figure 15:
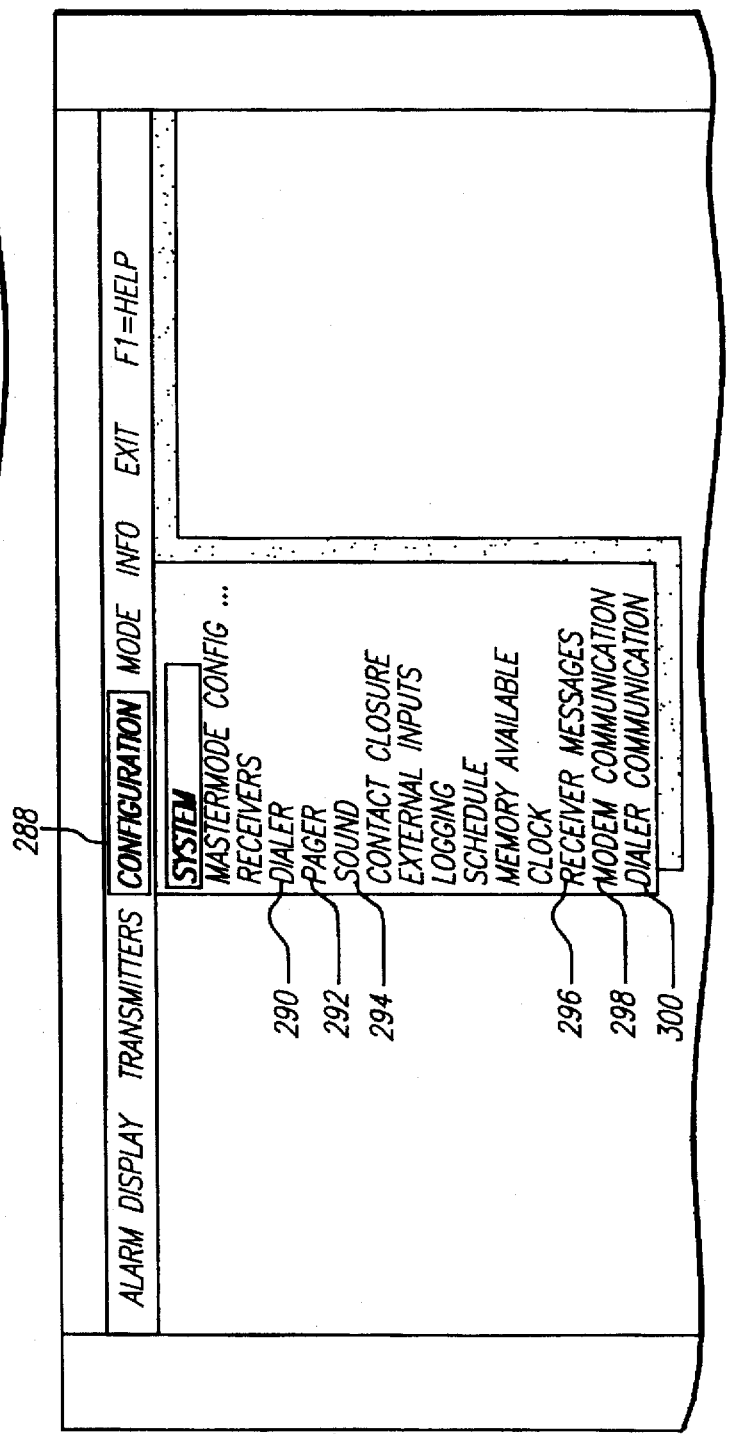

As shown in FIG. 15, the type of alert response to detected shocks, tampers, lack of proximity, or a low battery condition is selected by the user 288. Such alert types include dialing an alarm service at the central monitoring station 290, dialing a pager carried by an individual 292, or sounding an audible alarm 294. Messages from the receiver 296, a modem 298, or received from the central monitoring station can be viewed 300.

Figure 16:
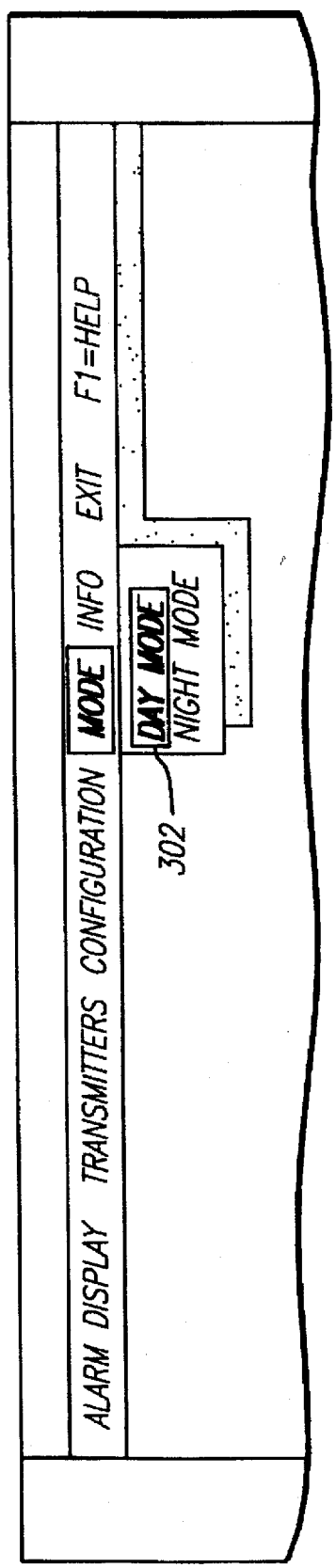

Referring to FIG. 16, the system has two modes of operation, a day mode and a night mode 302. During the day it is expected that potential customers will be viewing and hopefully trying out various automobiles. When the computer is in day mode, signals such as shock flags received by the local computer 24 from the local receiver 22 (FIG. 7) are qualified. They are recorded but not acted upon by the computer. However, to thwart efforts by unauthorized persons to disable or remove the module while shock flags are qualified and then return at night to remove the automobile, the system continues to incorporate a tamper signal attribute to generate an alert signal when a flag signal representative of tamper appears in the signal from the receiver 22. Shock flags might be qualified, but the local computer 24 (FIG. 7) will still alert upon receipt of a signal such as a tamper flag.

The monitoring system at the auto dealership constitutes and is recognized as an account number by the central monitoring station 82 shown in FIG. 1. This account number is leased by the automobile dealership station from the central monitoring station and is recorded in a memory in the computer. This account number is transmitted with every alert signal dialled to the central monitoring station to identify the dealership and can be accessed and changed using the mouse and computer screen as shown in FIG. 17, 304. A telephone number corresponding to the central monitoring station to be dialled can be accessed and changed by the user. The computer memory is programmed with a security lock to limit authorized use requiring entry of passwords 306.

In a typical dealership setting, the user sets up the account by correlating modules to respective automobiles and enters the telephone number of the central monitoring station into the computer using keyboard 68 (FIG. 7). The user enables all transmitters. The user selects the desired alarm response in the form of dialing the monitoring station, dialing a pager, generating an audible alert, a printout, and a computer screen displayed message. The user selects day mode operation of the system wherein the system does not alert upon detection of a shock to the module.

With the computer so armed, in the event an unauthorized person 67 (FIG. 6) should open the door to a vehicle and start the vehicle or even tow it off by a tow truck or the like, certain vibrations will be affected within the frame of the vehicle and will be imparted through the module housing 36 (FIG. 3) to the shock sensor 44 (FIG. 4). A shock sensed by such sensor in the module on the vehicle will generate a shock signal. The shock signal will be communicated through the encoder 54 (FIG. 1) to be encoded with a flag corresponding to the module identification number stored in the transmitter 30 and a flag indicating the existence of a shock and introduced to the module transmitter to be transmitted to the local station 20 (FIG. 5). The receiver 22 (FIG. 5) receives such a transmission from the module transmitter and generates a receiver signal corresponding to the signal and the flags therein which is passed to the computer via the RS-232 cable 76. The operating system within the computer operates to decode the flag corresponding to the identification number of the module thereby identifying the module and associated vehicle, such information is stored in a memory in the computer. The computer further operates to decode the shock flag from the receiver signal and store this occurrence in memory. The computer is responsive to the user's selection of day mode and as a result does not alert in response to the shock flag because of the day mode selection.

Figure 11:
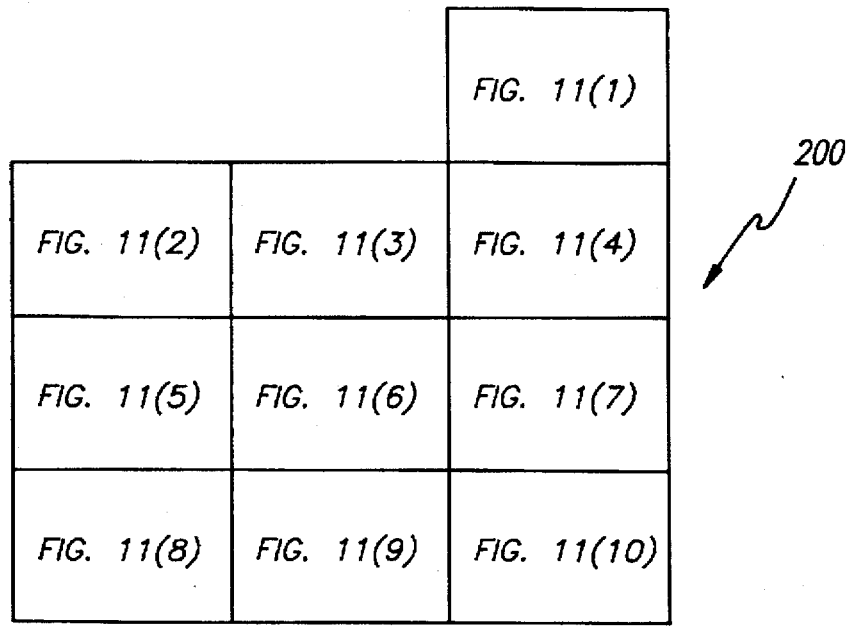
FIG. 11 is a detailed schematic of electrical circuits of a dialer card installed in the computer shown in FIG. 7.

However, should an unauthorized person remove the module 26 from the underside of the automobile 34 (FIG. 5), the tamper switch button 48 will be released to allow the switch to close and generate a tamper signal. The transmitter 30 (FIG. 4) in the module will then generate a status signal in response to the tamper signal and encode thereon a flag corresponding to the module identification number and a flag corresponding to the tamper attempt. The encoded status signal 32 will be transmitted to the receiver at the local station 20. The receiver 22 is responsive to the received status signal 32 to generate a receiver signal containing the identification flag and the flag indicative of the tamper attempt and passes the signal to the computer 24. The computer decodes the identification and tamper flags, determines and stores the identity of the module in memory, and alerts according to selected programmed routines. The computer commands the dialer card 200 (FIG. 1) to dial an alert signal to the central monitoring station 82 by writing data indicating the telephone number of the central monitoring station, the account number of the automobile dealership, the zone number of the vehicle on the sales lot, and the existence of a tamper attempt, to its data register. The dialer card microcontroller 234 (FIG. 11) detects the commands at the data register and controls the tone encoder 242 to introduce industry standard tones onto the telephone lines necessary to dial the central monitoring station and to indicate a tamper attempt. The dialer card 200 is utilized by the computer to dial a pager 80 (FIG. 1) in a similar fashion. The computer is programmed to translate the receiver signal into an alert message displayed on the computer screen 70 (FIG. 7) in response to the decoded tamper flag. The message displayed on the screen indicates the time of the occurrence, the zone of occurrence, that the alarm is a tamper attempt, and the module number. The computer is programmed to translate the receiver signal into a printout message from the printer containing similar information. The computer also generates an audible alert for the benefit of an automobile dealership operator not in the immediate vicinity of the computer.

When night mode is selected, shock flags are not qualified. Should a sensor, while the system is in this mode, detect a shock, a shock signal will be generated. The corresponding transmitter will then generate a status signal and encode it with a flag indicative of such shock and transmit such signal 32 to the receiver 22 at the local station 20, as shown in FIG. 5. The receiver then passes a receiver signal to the computer. The computer will detect a flag within the receiver and alert according to selected desired responses as described above.

Multiple systems may be used on the same automobile lot dealership. For instance, the more vulnerable automobiles may be monitored by a first system while less desirable automobiles could be monitored by a second. Because of the relative infrequency of theft of the less desirable automobiles, and to save power, the proximity signal generator may cause the status signal to be transmitted relatively infrequently as for instance, on an hourly basis. However, for the automobiles more prone to theft, the proximity status signal may be transmitted every ten minutes as previously described. Also, reports may be generated at different frequencies for different groups of cars.

From the foregoing, it will be appreciated that the monitoring system of the present invention can effectively monitor damage to and attempted theft of a large number of automobiles on a dealership lot. The dealership can search for cars reported as nonexistent. Stolen cars can be rapidly identified and broken modules can be repaired. The system can be used, for instance, in congregate care facilities such as hospitals to monitor equipment or patients. The system can also monitor marinas, warehouses, agricultural buildings, government facilities, construction sites, golf courses, as well as other environments.

While particular forms of the invention have been illustrated and described, it will be apparent that various modifications can be made without departing from the spirit and scope of the invention.

What is claimed is:

1. A monitoring system for monitoring a plurality of mobile units located randomly about a selected security area, and comprising:

a set of modules for monitoring the respective said units each including a housing formed with an interior compartment, a signal generator in said compartment programmed to generate a proximity signal, a condition sensor in said compartment operative in response to a selected security condition of said each module to generate a detector flag signal, a battery in said compartment and in circuit with said generator and said sensor, a transmitter and an antenna in said compartment and in circuit with said generator, said sensor and said battery responsive to said proximity signal and said detector flag signal to generate a radio frequency status signal, an encoder in said compartment and in circuit with said transmitter and said antenna responsive to said radio frequency status signal to encode said radio frequency status signal with a code signal unique to the individual modules of said set and with said detector flag signal to produce an encoded radio frequency signal, said transmitter operative in response to said encoded radio frequency signal to cause said antenna to transmit said encoded radio frequency signal at a signal strength equal to but not exceeding a predetermined magnitude for a distance up to but not exceeding a selected distance bounded by said selected security area;

a local receiver responsive to the respective said encoded radio frequency signal of a signal strength equal to or greater than but not less than said predetermined magnitude to generate a respective receiver signal characteristic of the respective said encoded radio frequency signal; and a computer coupled to said receiver and responsive to the respective said receiver signal to generate an alarm signal, said computer including a discriminator responsive to said receiver signal to decode said code signal from said encoded radio frequency status signal, and a monitor responsive to said code signal to identify the module emitting said proximity signal and said detector flag signal.

2. A monitoring system as recited in claim 1, wherein:

said condition sensor comprises a respective non-ferrous sensor in respective said compartment in circuit with the respective said transmitter and operative in response to vibration to generate the respective said detector flag signal.

3. A monitoring system as recited in claim 1, wherein:

said modules each further include attachment means carried from said housing to attach the respective said modules to the respective said units, and a respective tampering sensor in said compartment and in circuit with said transmitter and responsive to release of the respective said attachment means and removal of the respective said modules from the respective said units to generate a respective tamper signal; and said encoder is further responsive to the respective said tamper signal to encode the respective said radio frequency status signal with the respective said tamper signal to generate the respective said encoded radio frequency signal.

4. A monitoring system as recited in claim 1, wherein:

said modules each further include a respective battery sensor responsive to a predetermined condition of the respective said battery to generate a respective battery condition signal and said transmitter is responsive to said battery condition signal to generate the respective said radio frequency status signal; and said encoder is further responsive to said battery condition signal to encode the respective said radio frequency status signal with said battery condition signal to generate the respective said encoder radio frequency signal.

5. A monitoring system as recited in claim 4, wherein:

said computer includes a decoder means to decode the respective said receiver signals and to generate as computer readable signals each of the respective said code signal, the respective said detector signal, the respective said proximity signal, and the respective said battery condition signal.

6. A monitoring system as recited in claim 5, further comprising:

said computer is operative in response to each of the respective said computer readable code, detector, proximity and battery condition signals to generate respective electronic commands corresponding to each of said computer readable signals;

a telecommunications interface including a dialer coupled to said computer and to a telephone line which includes a converter operative in response to said electronic commands to convert said electronic commands into a sequence of tone signals.

7. A monitoring system as recited in claim 6 for transmitting a telecommunication signal to a central monitoring station, wherein:

said dialer is responsive to said electronic commands to dial a predetermined telephone number and to transmit said sequence of tone signals on said telephone line to said central minitoring station.

8. A monitoring system as recited in claim 5, further comprising:

a watchdog means coupled to said computer and monitoring said decoder and operative in response to the absence of the respective said proximity signal encoded in the respective said receiver signal to generate a watchdog signal.

9. A monitoring system as recited in claim 8, further comprising:

a programmable dialer card coupled to said computer and a telephone line and operative in response to said alarm signal or said watchdog signal to dial a predetermined telephone number and to generate a sequence of tone signals and to transmit said sequence of tone signals to said telephone line;

an alarm coupled to said computer operative in response to said alarm signal or said watchdog signal to generate an audible alarm;

a printer coupled to said computer operative in response to said alarm signal or said watchdog signal to generate a printed alarm; and a display coupled to said computer operative in response to said alarm or said watchdog signal to present each of said computer readable signals on said display to a user.

10. A system for monitoring a plurality of mobile units and for receiving and analyzing information from the mobile units to detect unauthorized tampering with such units and to account for their status, comprising:

a plurality of identifiable modules to be attached to the respective said mobile units to be monitored and including respective security sensors, proximity signal generators, batteries, antennas and transmitters connected in a circuit;

the respective said proximity signal generators being programmable to generate respective periodic proximity signals;

the respective said security sensors being responsive to vibrations of a predetermined magnitude to generate respective vibration signals and attempted module tampering to generate respective tamper signals;

the respective said transmitters and antennas being responsive to the respective said proximity signals, the respective said vibration signals and the respective said tamper signals to generate respective radio frequency status signals and including an encoder operative in response to said radio frequency status signals to encode the respective said radio frequency status signals with respective identification codes identifying the respective modules and to further encode the respective said vibration signals and the respective said tamper signals in said radio frequency status signal to generate an encoded radio frequency status signal;

a local station including a local receiver responsive to said encoded status signals to generate a receiver signal; and a computer coupled to said local receiver responsive to said receiver signal to generate an alert signal.

11. A monitoring system as recited in claim 10, wherein:

said computer includes a decoder responsive to said receiver signal to decode from said receiver signal respective said identification codes, respective said vibration signals, and respective said tamper signals and to generate respective computer readable identification code signals, vibration signals and tamper signals, a recorder to record all said computer readable signals, and wherein said computer is further responsive to the respective said computer readable signals to generate summary reports of all said computer readable signals.

12. A monitoring system as recited in claim 11, wherein:

said transmitter is responsive to said encoded radio frequency signal to cause said antenna to transmit said encoded radio frequency signal at a signal strength equal to but not exceeding a predetermined magnitude for a distance up to but not exceeding a selected distance; and said computer includes a monitor responsive to the absence of the computer readable identification code signals during a predetermined interval of time from any one of said identifiable modules and also responsive to any one of said vibration signals or said tamper signals to generate said alert signal, and a dialer responsive to said alert signal to dial a central monitoring station.

13. A monitoring system as recited in claim 12, wherein:

said dialer further comprises a programmable dialer card electronically coupled between said computer and a telephone line;

said computer is further responsive to said alert signal to generate respective computer instruction signals and to read dialer data from said programmable dialer card and write both respective said computer instruction signals and computer data to said programmable dialer card; and said data is representative of said alert signal and each of the respective said identification code signals, said vibration signals and said tamper signals.

14. A monitoring system as recited in claim 13, wherein:

said programmable dialer card further includes a microcontroller programmed with stored routines representative of an industry standard telephone protocol operative in response to respective said computer instruction signals to generate respective command signals and time signals;

means responsive to the respective said computer instruction signals for determining if said computer is writing respective said computer instruction signals and said computer data to the microcontroller and to generate a write signal;

means responsive to said write signal for storing the respective said computer instruction signals and said computer data;

means responsive to said write signal for passing respective said computer instruction signals to said microcontroller;

means responsive to said respective command signals from said microcontroller for determining if said microcontroller has data to be written to said computer to generate a data signal;

means responsive to said data signal for storing data from said microcontroller;

means responsive to said data signal for passing said data to said computer;

means responsive to said command signals to encode said computer data into a sequence of 1800 Hz tone signals;

means for passing said sequence of 1800 Hz tone signals onto said telephone line; and means responsive to 1800 Hz tone signals received from said telephone line to generate decoded commands and decoded data recognizable by said microcontroller.

15. A monitoring system as recited in claim 13, wherein said dialer card includes:

an address decoder network including a decoder, a resistor network, and a DIP switch, all coupled to said computer;

a bi-directional data latch coupled to said computer;

a logic network coupled to said address decoder network;

a flip-flop coupled to said logic network;

a status latch coupled to said flip-flop;

an output asynchronous communications buffer coupled to said status latch;

an input asynchronous communication buffer coupled to said bi-directional latch;

a microcontroller coupled to said input asynchronous communications buffer and said output asynchronous communications buffer;

a tone encoder/decoder coupled to said microcontroller;

a hybrid device coupled to said tone encoder/decoder; and a telephone line coupler coupled to said hybrid device.

16. A set of modules adapted for use in a system including a plurality of said modules attachable to respective automobiles to automatically monitor their status and responsive to a predetermined condition to generate an alarm signal for communication to a central monitoring station, comprising:

a plurality of said modules including respective housings for mounting from the respective said automobiles, respective proximity signal generators in the respective said housings to generate respective proximity signals at a periodic rate, respective tamper switches in the respective said housings responsive to removal of the respective said housings from the respective said automobiles to generate respective tamper signals, respective batteries in the respective said housings and coupled in circuit with said generators and said switches, respective transmitters and antennas in the respective said batteries, the respective said generators and the respective said switches, the respective said transmitters being responsive to the respective said proximity signals and the respective said tamper signals to generate respective radio frequency status signals, respective encoders responsive to the respective said radio frequency status signals to encode the respective said radio frequency status signals with specific identification code signals corresponding to the respective said modules and with respective said tamper signals to generate respective encoded radio frequency signals, and the respective said transmitters are responsive to the respective said encoded radio frequency signals to cause the respective said antennas to transmit the respective said encoded radio frequency signal at a signal strength equal but no exceeding a predetermined magnitude for a distance up to but not exceeding a selected distance; and a local station including a receiver responsive to the respective said encoded radio frequency signals of a signal strength equal to or greater than but not less than said predetermined magnitude to generate respective encoded receiver signals and a computer coupled to said receiver and responsive to both the respective said encoded receiver signals and to the absence of the respective said encoded receiver signals over a predetermined period of time to generate said alarm signal, and wherein said computer includes an internal dialer card coupled between said computer and a telephone line and responsive to said alarm signal to transmit said alarm signal over said telephone line to said central monitoring station.

17. A monitoring system as recited in claim 16, wherein:

said modules include respective vibration sensors within the respective said housings responsive to a predetermined magnitude of vibration of the respective said modules for generating respective vibration signals;

said transmitters are responsive to the respective said vibration signals to generate the respective said radio frequency status signals; and respective said encoders are responsive to said vibration signals to encode respective said radio frequency status signals with said vibration signals to generate respective said encoded radio frequency signals.

18. A monitoring system as recited in claim 17, wherein:

the respective said shock sensors include respective piezoelectric transducers; and said dialer card further includes means for generating a 2300 Hz handshaking tone signal and a sequence of 1800 Hz data tone signals.

19. A monitoring module for use in monitoring the proximity of a mobile unit to a local station, and comprising:

a plastic housing formed with an opening, an antenna, a battery, an annular magnet carried on said housing and including a contact surface for attaching said housing to the surface of said mobile units and formed with a hole positioned over said opening to define a button path;

a tamper sensor including a normally closed switch closable to generate a tamper signal and carrying a spring loaded button for travel through said button path to normally project beyond said contact surface such that mounting of said magnet flush on said surface of said mobile unit will depress said button to open said switch;

a shock sensor including a ceramic piezoelectric transducer operative to generate a shock signal when a shock of a predetermined magnitude is sensed;

a proximity signal generator programmed to generate a periodic proximity signal;

a battery sensor responsive to decreasing battery voltage to generate a battery voltage indicator signal;

a transmitter responsive to said tamper signal, said shock signal, said proximity signal or said battery voltage indicator signal, for generating a status signal; and an encoder responsive to said status signal to encode it with an identification signal and flags representative of said shock signal, said tamper signal, said proximity signal, and said battery voltage indicator and to transmit the resultant encoded status signal to said local station.

20. A security sensor for sensing vibration of a unit and travel of said unit beyond a predetermined distance from a local station having a radio receiver responsive to a radio frequency signal of a signal strength equal to or greater than but not less than predetermined magnitude and a proximity monitor operative in response to the absence of said signal during a predetermined interval of time to generate an alarm signal, and comprising:

a housing formed with an interior compartment and including an attachment means carried on said housing for attaching said housing to the surface of said unit;

a vibration sensing transducer in said compartment operative in response to vibration of a predetermined magnitude to generate a vibration signal;

a signal generator in said compartment in circuit with said transducer and programmed to generate a periodic signal;

a battery in circuit with said transducer and said generator;

a transmitter and an antenna in said compartment in circuit with said transducer, said generator and said battery and responsive to either or both said vibration signal and said periodic signal to generate a radio frequency status signal;

an encoder in said compartment in circuit with said transmitter and responsive to said radio frequency status signal and also responsive to said vibration signal to generate an identification code signal identifying said security sensor and to encode said radio frequency status signal with both said identification code signal and said vibration signal to generate an encoded radio frequency status signal; and said transmitter and said antenna being responsive to said encoded radio frequency status signal to cause said antenna to transmit said encoded radio frequency status signal at a signal strength equal to but not exceeding said predetermined magnitude for a distance up to but not exceeding said predetermined distance.

21. A security sensor as recited in claim 20, further comprising:

a tamper sensor in said compartment in circuit with said transmitter operative in response to removal of said security sensor from said unit to generate a tamper signal;

wherein said transmitter is further responsive to said tamper signal to generate said radio frequency status signal; and said encoder is further responsive to said tamper signal to further encode said radio frequency status signal with said tamper signal and to generate said encoded radio frequency status signal.

22. A security sensor for sensing vibration of a unit and travel of said unit beyond a predetermined distance from a local station, and comprising:

a housing formed with an interior compartment and including an attachment means carried on said housing for attaching said housing to the surface of said unit;

a vibration sensing transducer in said compartment operative in response to vibration of a predetermined magnitude to generate a vibration signal;

a signal generator in said compartment in circuit with said transducer and programmed to generate a periodic signal;

a battery in circuit with said transducer and said generator;

a transmitter and an antenna in said compartment in circuit with said transducer, said generator and said battery and responsive to either or both said vibration signal and said periodic signal to generate an radio frequency status signal;

an encoder in said compartment in circuit with said transmitter and responsive to said radio frequency status signal and also responsive to said vibration signal to generate an identification code signal identifying said security sensor and to encode said radio frequency status signal with both said identification code signal and said vibration signal to generate an encoded radio frequency status signal; and said transmitter and said antenna being responsive to said encoded radio frequency status signal to cause said antenna to transmit said encoded radio frequency status signal at a signal strength equal to but not exceeding a predetermined magnitude for a distance up to but not exceeding said predetermined distance.

* * * * *

UNITED STATES PATENT AND TRADEMARK OFFICE
CERTIFICATE OF CORRECTION

PATENT NO. : 5,708,417
DATED : January 13, 1998
INVENTOR(S) : Erven Tallman et al.

It is certified that error appears in the above-identified patent and that said Letters Patent is hereby corrected as shown below:

Column 13, line 61, delete "encoder" and insert --encoded--;

Column 14, line 21, delete "minitoring" and insert --monitoring--;

Column 16, line 57, after "said" (first occurrence) insert --housings and coupled in circuit with the respective said--.

Signed and Sealed this

Thirty-first Day of March, 1998

Attest:

BRUCE LEHMAN

Attesting Officer   Commissioner of Patents and Trademarks